US011333462B2

(12) United States Patent
Busch, II

(10) Patent No.: US 11,333,462 B2
(45) Date of Patent: *May 17, 2022

(54) ELECTROMAGNETIC ACCELERATOR

(71) Applicant: Ra Matet, LLC, Gainesville, FL (US)

(72) Inventor: Richard C. Busch, II, Gainesville, FL (US)

(73) Assignee: RA MATET, LLC, Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/951,591

(22) Filed: Nov. 18, 2020

(65) Prior Publication Data
US 2021/0148670 A1 May 20, 2021

Related U.S. Application Data

(63) Continuation-in-part of application No. 16/687,648, filed on Nov. 18, 2019, now Pat. No. 10,928,157.

(51) Int. Cl.
*F41B 6/00* (2006.01)
*H02K 41/035* (2006.01)

(52) U.S. Cl.
CPC .......... *F41B 6/003* (2013.01); *H02K 41/0356* (2013.01)

(58) Field of Classification Search
None
See application file for complete search history.

(56) References Cited

U.S. PATENT DOCUMENTS

| 512,340 | A | | 1/1894 | Tesla | |
|---|---|---|---|---|---|
| 2,624,841 | A | * | 1/1953 | McMillan | H05H 13/04 315/501 |
| 3,247,476 | A | * | 4/1966 | Pintell | H01F 30/02 336/200 |
| 3,469,118 | A | * | 9/1969 | Ferry | H02N 1/08 310/309 |
| 4,432,333 | A | * | 2/1984 | Kurherr | F41B 6/00 89/8 |

(Continued)

OTHER PUBLICATIONS

Chan et al., Electromagnetic Coil Gun Final Report, Capstone Design—Electronics, Rutgers School of Engineering, Dept. of Electrical and Computer Engineering, May 1, 2013.

(Continued)

*Primary Examiner* — Srinivas Sathiraju
(74) *Attorney, Agent, or Firm* — Fellers, Snider, Blankenship, Bailey & Tippens, P.C.; Terry L. Watt

(57) ABSTRACT

An electromagnetic accelerator system may include a barrel defining a bore through which an acceleration path extends. An electromagnetic coil may be positioned around the barrel such that the acceleration path extends through a core of the electromagnetic coil. A first electrical contact may be positioned along the acceleration path approximately within the core of the electromagnetic coil and electrically coupled to the electromagnetic coil. A second electrical contact may position along the acceleration path approximately within the core of the electromagnetic coil and spaced apart from the first electrical contact. The second electrical contact may be electrically coupleable to the first electrical contact to complete a circuit when a projectile to be accelerated is positioned therebetween.

16 Claims, 12 Drawing Sheets

(56) References Cited

U.S. PATENT DOCUMENTS

| | | | | |
|---|---|---|---|---|
| 4,833,965 A * | 5/1989 | Jasper, Jr. | ............... | F41B 6/006 89/8 |
| 4,840,106 A * | 6/1989 | Jasper, Jr. | ............... | F41B 6/006 89/8 |
| 4,944,211 A * | 7/1990 | Rowan | ................... | E21B 7/007 89/8 |
| 4,997,047 A * | 3/1991 | Schroeder | ................ | E21B 7/26 175/162 |
| 5,182,254 A * | 1/1993 | Owens | ................... | F41B 6/006 73/12.05 |
| 5,285,699 A * | 2/1994 | Walls | ................. | B29C 66/5221 74/572.12 |
| 5,389,195 A * | 2/1995 | Ouderkirk | .............. | B29C 59/14 427/535 |
| 5,483,663 A | 1/1996 | Dreizin | | |
| 5,483,863 A * | 1/1996 | Dreizin | .................. | F41B 6/006 89/8 |
| 7,614,393 B1 * | 11/2009 | Lu | ........................... | F42B 6/006 89/1.7 |
| 7,864,013 B2 * | 1/2011 | Muelleman | ............ | F41B 6/006 336/178 |
| 8,109,190 B2 * | 2/2012 | Proulx | ...................... | F42B 6/00 89/8 |
| 8,302,584 B1 * | 11/2012 | Lu | .......................... | F41B 6/003 124/3 |
| 8,387,509 B1 * | 3/2013 | Proulx | .................. | H02K 41/00 89/8 |
| 9,032,857 B2 * | 5/2015 | Amiet | .................... | F41B 6/006 89/8 |
| 9,476,668 B1 * | 10/2016 | Grace | ....................... | F41A 1/02 |
| 9,581,409 B2 * | 2/2017 | Post | ........................ | F41B 6/003 |
| 9,784,523 B2 * | 10/2017 | Grace | ....................... | H02K 9/04 |
| 10,928,157 B1 * | 2/2021 | Busch, II | ............... | H05H 15/00 |
| 10,976,129 B1 * | 4/2021 | Timpson | ................ | F41B 6/003 |
| 11,073,357 B2 * | 7/2021 | Hartman | ................ | F41B 6/003 |
| 2008/0012680 A1 * | 1/2008 | Muelleman | ............ | H01F 27/34 336/212 |
| 2012/0174901 A1 * | 7/2012 | Post | ........................ | F41B 6/003 124/3 |
| 2013/0162136 A1 * | 6/2013 | Baldwin | ................... | H01J 1/30 313/311 |
| 2015/0302940 A1 * | 10/2015 | Raman | ..................... | G21B 1/15 376/101 |
| 2015/0323281 A1 * | 11/2015 | Gonzaga | ................. | F41B 6/006 124/3 |
| 2016/0032904 A1 * | 2/2016 | Kaplan | .................... | G21D 1/00 60/698 |
| 2016/0045841 A1 * | 2/2016 | Kaplan | .................. | C01B 32/05 429/49 |
| 2016/0245613 A1 * | 8/2016 | Grossnickle | ............ | F41A 31/00 |
| 2016/0297548 A1 * | 10/2016 | Powell | .................... | B64G 1/002 |
| 2016/0341514 A1 * | 11/2016 | Grace | ................ | H02K 41/0356 |
| 2017/0307325 A1 * | 10/2017 | Grossnickle | ............ | F41A 21/32 |
| 2017/0343314 A1 * | 11/2017 | Hartman | ................. | F41B 6/003 |
| 2019/0201708 A1 * | 7/2019 | Hathaway | .................. | A61N 2/02 |
| 2020/0025507 A1 * | 1/2020 | Hartman | ................. | F41B 6/006 |
| 2021/0148670 A1 * | 5/2021 | Busch, II | ................. | H05H 7/04 |
| 2021/0296929 A1 * | 9/2021 | Grossnickle | ............ | F42B 12/74 |

OTHER PUBLICATIONS

Gherman, Two Fluxes Multistage Induction Coil Gun, Henri Coanda Air Force Academy, Brasov, Romania, Mar. 13, 2015.

* cited by examiner

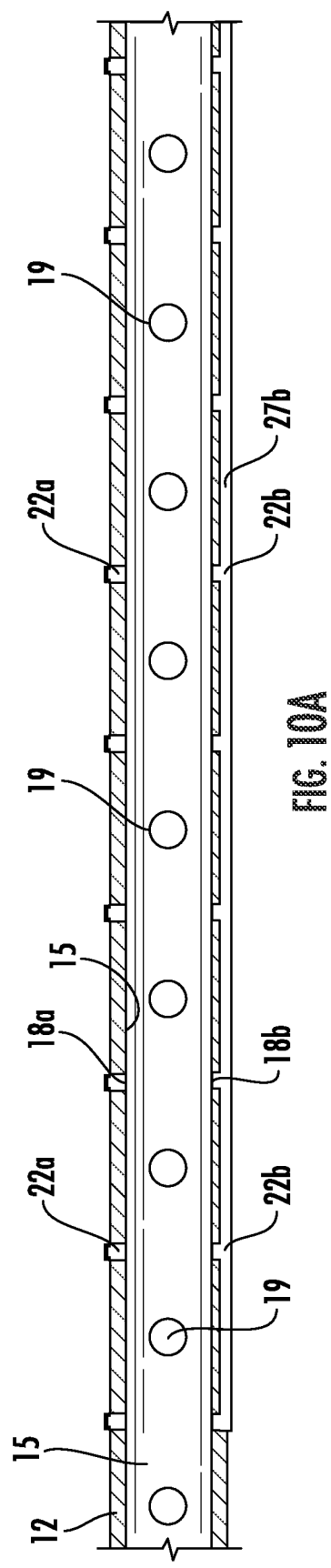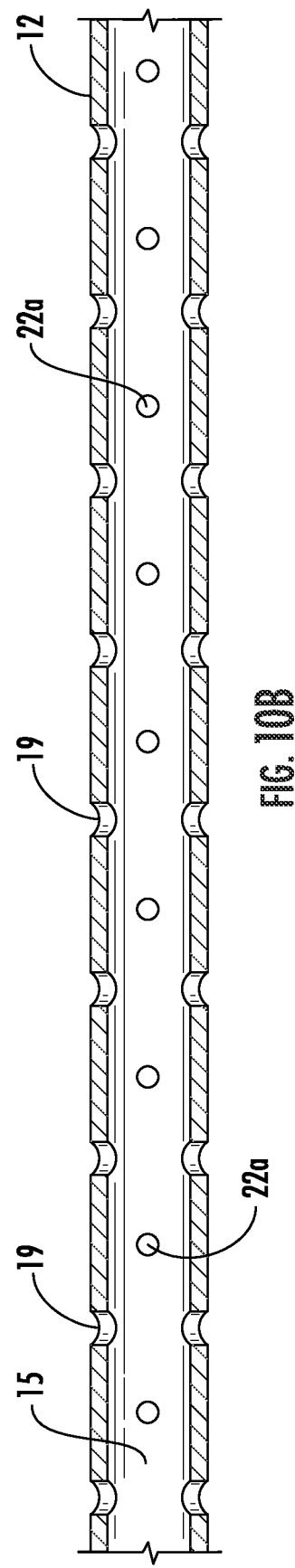

ELECTROMAGNETIC ACCELERATOR

CROSS-REFERENCE

This application is a continuation-in-part of U.S. application Ser. No. 16/687,648, which was filed with the U.S. Patent and Trademark Office on Nov. 18, 2019, the entirety of which is incorporated herein by reference.

TECHNICAL FIELD

The present disclosure describes improvements in apparatuses utilizing electromagnetic forces for accelerating matter and fields. More specifically, the present disclosure describes electromagnetic accelerators and components thereof.

BACKGROUND

Electromagnetic accelerators used electromagnetic fields to accelerate charged objects. One type of electromagnetic accelerator is an electromagnetic railgun. Electromagnetic railguns utilize two parallel rails and an armature that extends between the two rails. Positive and negative poles of a power supply are connected to the rails to form a circuit together with the armature. In operation, a DC pulsed power current is conducted along one rail, across the armature, and then back through the other rail. The electrical current produces an electromagnet wherein the net magnetic field between the two rails and armature acts at right angles to the plane of the rails and armature. The current flowing through the rails and armature, together with the magnetic field, generates Lorentz Force that acts on the armature in the direction of the rails as well as on each rail, directed away from the other. However, the rails are anchored to overcome the Lorentz Force while the armature is allowed to accelerate. In some configurations, the armature is a conductive projectile that spans the two rails. In other instances, a separate projectile is positioned on the armature to be indirectly accelerated by the electromagnetic fields.

While generally perceived to have great potential for military and other applications, the railgun has numerous drawbacks that have limited its widespread application. By design, the railgun uses a very inefficient method to transfer electromagnetic force to the projectile. The rail design is inefficient in its means of moving the projectiles through the barrel and generates enormous amounts of friction. Consequently, railguns also create a massive build-up of heat during firing due to the friction and long periods arcing of high voltage energy through rails and, therefore, must cool down between shots. Another issue is that the rail design works against itself. That is, the rails, when energized, repel each other with enormous force. This added to the heat created by the design of the electromagnetic transfer of force to the projectile and the inefficient barrel design has resulted in railguns historically destroying themselves.

SUMMARY

In one aspect, an electromagnetic accelerator system includes an electromagnetic apparatus for moving projectiles utilizing a source, or sources, of electricity and spirally wound electromagnets triggered by the projectile's movement through apparatus.

In another aspect, an electromagnetic accelerator system may include a barrel defining an acceleration path extending along an interior of the barrel. An electromagnetic coil may be positioned around the barrel such that the acceleration path extends through a core of the electromagnetic coil. A first electrical contact may be positioned along the acceleration path approximately within the core of the electromagnetic coil and electrically coupled to the electromagnetic coil. A second electrical contact may be positioned along the acceleration path approximately within the core of the electromagnetic coil and spaced apart from the first electrical contact. The second electrical contact may be electrically coupleable to the first electrical contact to complete a circuit when a projectile to be accelerated is positioned therebetween.

In one example, the electromagnetic coil is configured to be electrically coupled to a power supply, which may include a capacitor, such that when the projectile is positioned between the first electrical contact and the second electrical contact and completes the circuit, the capacitor fires and electron flow moves through the electromagnet coil and the projectile to the second electrical contact.

In any of the above or another example, the electromagnetic coil is positioned to generate an electromagnetic point charge concentrated at a center of the electromagnetic coil, corresponding to a longitudinal center of the acceleration path.

In any of the above or another example, the first electrical contact is positioned at about 180 degrees in opposition to the second electrical contact.

In any of the above or another example, the electromagnetic coil comprises a conductor that is spirally wound in parallel upon itself. In a further example, the conductor comprises a flat or ribbon conductor.

In another aspect, an electromagnetic accelerator system may include a spiral wound electromagnetic coil, a barrel defining a bore and positioned within the core, and a first electrical contact and a second electrical contact positioned within the bore of the barrel and the core. The spiral wound electromagnetic coil may electrically couple between the power supply, e.g., capacitor, and the first electrical contact. The second electrical contact may be configured to be in circuit with the first electrical contact when a projectile positions between the first and second electrical contacts. The projectile may close the circuit between the first and second electrical contacts. Electron flow may flow through the electromagnetic coil to the first electrical contact and from the first electrical contact, through the projectile, to the second electrical contact. In some embodiments, the first electrical contact may be about 180 degrees in opposition to the second electrical contact across the bore.

In yet another aspect, a method of accelerating a projectile includes causing a projectile to be positioned between first and second electrical contacts located within a core of a spiral wound electromagnetic coil, wherein, when positioned between the two electrical contacts, the projectile completes a circuit causing electron flow through the spiral wound electromagnetic coil to the first electrical contact and from the first electrical contact through the projectile to the second electrical contact, accelerating the projectile by Lorentz Force. In one example, the projectile is an object, particle, gas, or electromagnetic field.

In one example, the electromagnetic coil comprises a conductor that is spirally wound in parallel upon itself. In a further example, the conductor comprises a flat or ribbon conductor.

In still another aspect, a method of accelerating a projectile includes triggering discharge of a capacitor or other power supply by causing a projectile to be positioned between first and second electrical contacts located within a core of a spiral wound electromagnetic coil electrically coupled to the capacitor or other power supply.

In one example, the electromagnetic coil comprises a conductor that is spirally wound in parallel upon itself. In a further example, the conductor comprises a flat or ribbon conductor.

In still yet another aspect a method of sequentially triggering discharge of one or more capacitors with a moving projectile comprising sequentially completing circuits between sets of electrical contacts positioned along an acceleration path. Each of the sets of electrical contacts may position approximately within a core of a spiral wound electromagnetic coil. Completion of the circuits may cause the triggered capacitors to discharge electron flow through the spiral wound electromagnetic coil and projectile.

In one aspect, an electromagnetic accelerator system includes a spiral wound electromagnetic coil defining a core. The electromagnetic coil may be configured to electrically couple to a first pole of a power supply, such as a capacitor. The system may also include an acceleration path extending through the core, a first electrical contact and a second electrical contact. The first electrical may be positioned along the acceleration path and be electrically coupled to the electromagnetic coil. The second electrical contact may be positioned along the acceleration path and be configured to electrically couple to a second pole of the capacitor. The second electrical contact may be spaced apart from the first electrical contact to provide an open circuit configured to be closed by a projectile to be accelerated when positioned therebetween to cause the capacitor to discharge through the electromagnetic coil and projectile to accelerate the projectile by Lorentz Force.

In one example, at least one of the first electrical contact or the second electrical contact is positioned within the core. In a further example, the first and second electrical contacts are positioned within the core.

In one example, the first and second electrical contacts are positioned about 180 degrees in opposition. In one such example, the first and second electrical contacts are positioned with the core.

In one example, the projectile may be one of an object, particle, gas, or electromagnetic field. The first pole of the power supply may be a negative pole and the second pole may be a positive pole.

In one example, the electromagnetic coil may include an outer winding configured to electrically couple the electromagnetic coil to the first pole of the power supply and an inner winding that electrically couples the electromagnetic coil to the first electrical contact. The first pole is a negative pole of the power supply.

In some examples, the power supply comprises capacitor or a plurality of capacitors. In one example, the system also includes a barrel extending through the core and having a bore, wherein the acceleration path extends through the bore.

In another aspect, a method of accelerating a projectile includes causing a projectile to position between first and second electrical contacts along an acceleration path that extends through a core of a spiral wound electromagnetic coil. The first electrical contact may be electrically coupled to the first contact and a first pole of a power supply, which may include a capacitor. The second electrical contact may be electrically coupled to a second pole of the power supply. When positioned between the two electrical contacts, the projectile may complete a circuit causing the power supply to discharge through the electromagnetic coil to the first electrical contact and from the first electrical contact through the projectile to the second electrical contact, accelerating the projectile by Lorentz Force.

In one example, the first and second electrical contacts are positioned within the core. In the above or another example, the first and second electrical contacts are positioned about 180 degrees in opposition. In one example, the projectile is one of an object, particle, gas, or electromagnetic field. The first pole may be a negative pole of the power supply and the second pole may be a positive pole of the power supply. The electromagnetic coil may include an outer winding that electrically couples the electromagnetic coil to the first pole of the capacitor and an inner winding that electrically couples the electromagnetic coil to the first electrode. The first pole may be a negative pole of the power supply. In some examples, the power supply comprises a capacitor or a plurality of capacitors.

In any of the above or another example, the electromagnetic coil comprises a conductor that is spirally wound in parallel upon itself. In a further example, the conductor comprises a flat or ribbon conductor.

In still another aspect, an electromagnetic accelerator system includes an open electrical circuit comprising a spiral wound electromagnetic coil, a first electrode, and a second electrode; and an acceleration path extending through a core of the electromagnetic core. The first and second electrical contacts may be spaced apart along the acceleration path and electrically coupleable to close the open electrical circuit by a projectile to be accelerated that moves along the acceleration path between the first and second electrical contacts.

In one example, the electromagnetic coil comprises a conductor that is spirally wound in parallel upon itself. In a further example, the conductor comprises a flat or ribbon conductor.

In the above or another example, the system includes a supply of power provided by a power supply. In one example, the power supply includes a capacitor or a plurality of capacitors.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

FIG. 10A is a longitudinal cross-section of a multistage barrel according to various embodiments described herein;

FIG. 10B is a longitudinal cross-section of the multistage barrel in FIG. 10A taken through the ventilation holes according to various embodiments described herein;

DESCRIPTION

Figure 1A:
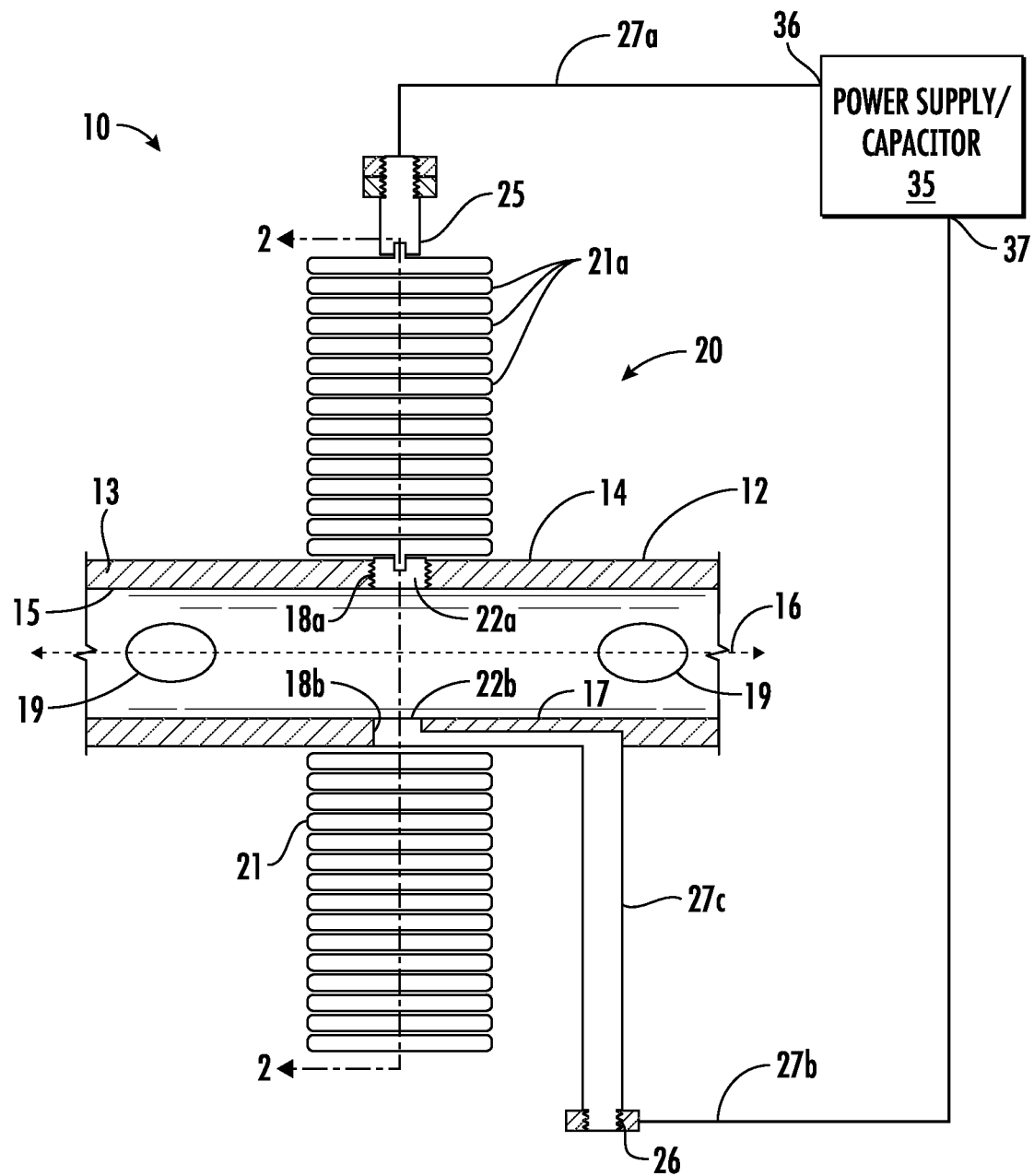
FIG. 1A is a longitudinal cross-section of an electromagnetic accelerator system according to various embodiments described herein.

The present disclosure describes electromagnetic accelerator systems, components, and related methods for propelling projectiles and claims priority to U.S. patent application Ser. No. 16/687,648, filed Nov. 18, 2019, the contents of which are hereby incorporated by reference herein.

The electromagnetic accelerator system may include an electromagnetic apparatus configured for moving a projectile utilizing one or more sources of electric power. The one or more sources of electric power may be referred to a power supply herein. In one example, the power supply is configured to supply DC power. In one example, the power supply comprises a capacitor or bank of capacitors. The one or more capacitors may be charged by a supply of power, which may include a DC power supply provided by a DC power source. A supply of AC power may also be used and may be rectified for use in acceleration of a projectile. Power may be supplied through one or more circuits.

In one embodiment, the apparatus may include or be positioned along an acceleration path along which a projectile may be accelerated. The apparatus may include one or more electromagnetic coils, e.g., spirally wound electromagnets, positioned around the acceleration path such that the acceleration path extends through a core of the one or more electromagnets. A supply of power may be fed to the one or more electromagnets by the power supply, e,g, DC power supply, one or more capacitors, etc. The one or more electromagnetic coils may be triggered by the projectile or movement thereof along the acceleration path. For example, a projectile may complete a circuit including the capacitor and electromagnetic coil causing the capacitor to discharge through the electromagnetic coil and projectile. In one example, the projectile contacts or approximates two electrical contacts along the acceleration path that completes a circuit. The circuit may include a DC power supply and coil. The circuit may include the capacitor and coil. In one configuration, the coil is electrically coupled between the DC power supply and/or capacitor and one of the electrical contacts. In another example, the movement or presence of the projectile is sensed triggering flow of the supply of power from the power supply, e.g., the capacitor to discharge, through the electromagnetic coil and the projectile.

In a further embodiment, the electrical contacts may be positioned along the acceleration path such that when the projectile is at a location around which an electromagnet is positioned, e.g., a location corresponding to a core of the electromagnet, the supply of power, e.g., from a capacitor, is triggered to discharge from the electromagnetic coil through the projectile, generating an electromagnetic point charge in the projectile. The supply of power or capacitor discharge also results in electron flow propagating through the electromagnetic coil causing generation of an electromagnetic point charge concentrated at the center of the electromagnetic coil, corresponding to the longitudinal center of the acceleration path, causing Lorentz Force to propel the projectile along the acceleration path. As point charges are strongest at their centers, the accelerator system may be configured to leverage this feature to align electromagnet point charges and projectile point charges at the center of the projectile for vastly increased efficiency and transfer of energy into the projectile.

In one embodiment, the apparatus may include or be positioned along an acceleration path along which a projectile may be accelerated. The apparatus may include one or more electromagnetic coils, e.g., spirally wound electromagnets, positioned around the acceleration path such that the acceleration path extends through a core of the one or more electromagnets. A supply of power may be fed to the one or more electromagnets by the power supply, e.g., DC power supply, one or more capacitors, etc. The one or more electromagnetic coils may be triggered by the projectile or movement thereof along the acceleration path. For example, a projectile may be positioned along the acceleration path such that when the projectile is at a location around which an electromagnet is positioned, e.g., a location corresponding to a core of the electromagnet, the capacitor is triggered to discharge from the electromagnetic coil through the projectile, generating an electromagnetic point charge in the projectile. The capacitor discharge also results in electron flow propagating through the electromagnetic coil causing generation of an electromagnetic point charge concentrated at the center of the electromagnetic coil, corresponding to the longitudinal center of the acceleration path, causing Lorentz Force to propel the projectile along the acceleration path. As point charges are strongest at their centers, the accelerator system may be configured to leverage this feature to align electromagnet point charges and projectile point charges at the center of the projectile for vastly increased efficiency and transfer of energy into the projectile.

In a further embodiment, the accelerator system includes an acceleration path that at least partially extends through a bore of a barrel. The accelerator system may further include one or more electrical assemblies comprising an electromagnetic coil, a first electrical contact, and a second electrical contact. The electromagnetic coil may electrically couple to the first electrical contact positioned along the acceleration path of the barrel and be electrically coupleable to the second electrical contact also positioned along the acceleration path of the barrel. The electromagnetic coil may extend around an exterior of the barrel to align generated electromagnetic point charges along a longitudinal center of the acceleration path of the barrel. Each electrical assembly may electrically couple to one or more capacitors, which may include multiple electrical assemblies that couple to one or more same or different single or groups of capacitors, to feed power to each electromagnetic coil. The second electrical contact may position at a location along the acceleration path of the barrel such that a projectile moving along through the interior of the barrel contacts both the first and second electrical contacts or otherwise completes a circuit, allowing the capacitor to discharge from the first electrical contact, through the projectile, to the second electrical contact to accelerate the projectile by Lorentz Force when taken together with the electromagnetic point charge created by the electromagnetic coil. The second electrical contact is preferably positioned in opposition to the first electrical contact about 180 degrees, or more preferably 180 degrees. However, such positioning may not be essential to the operation.

In embodiments including multiple electrical assemblies, each assembly may comprise a stage. As the projectile transverses each set of contacts, the associated capacitor fires to drive the projectile along the acceleration path, thereby causing numerous subsequent capacitor discharges into the projectile, as each subsequent stage discharge increases the velocity of the projectile.

As will become apparent upon reading the present disclosure, the teachings herein describe superior acceleration, energy efficiency, and safety profiles than current electromagnetic acceleration technologies. It should be appreciated that, as used herein, projectile may include an object; particle(s), including subatomic particle(s); gas, including air and ionized gases; or more generally matter as well as electromagnetic fields. Thus, the accelerator system and related teachings described herein may comprise particle accelerators, electromagnetic drives, propeller less drives, fluid pumps, ion drives, electron cannons, plasma cannons, electromagnetic pulse generators, electromagnetic punches, electromagnetic field generators, asteroid and near earth object interceptors, as well as military ordinance.

FIGS. 1A-14 illustrate various embodiments of the accelerator systems and components for use with accelerator systems wherein like numbers identify like features.

Figure 1B:
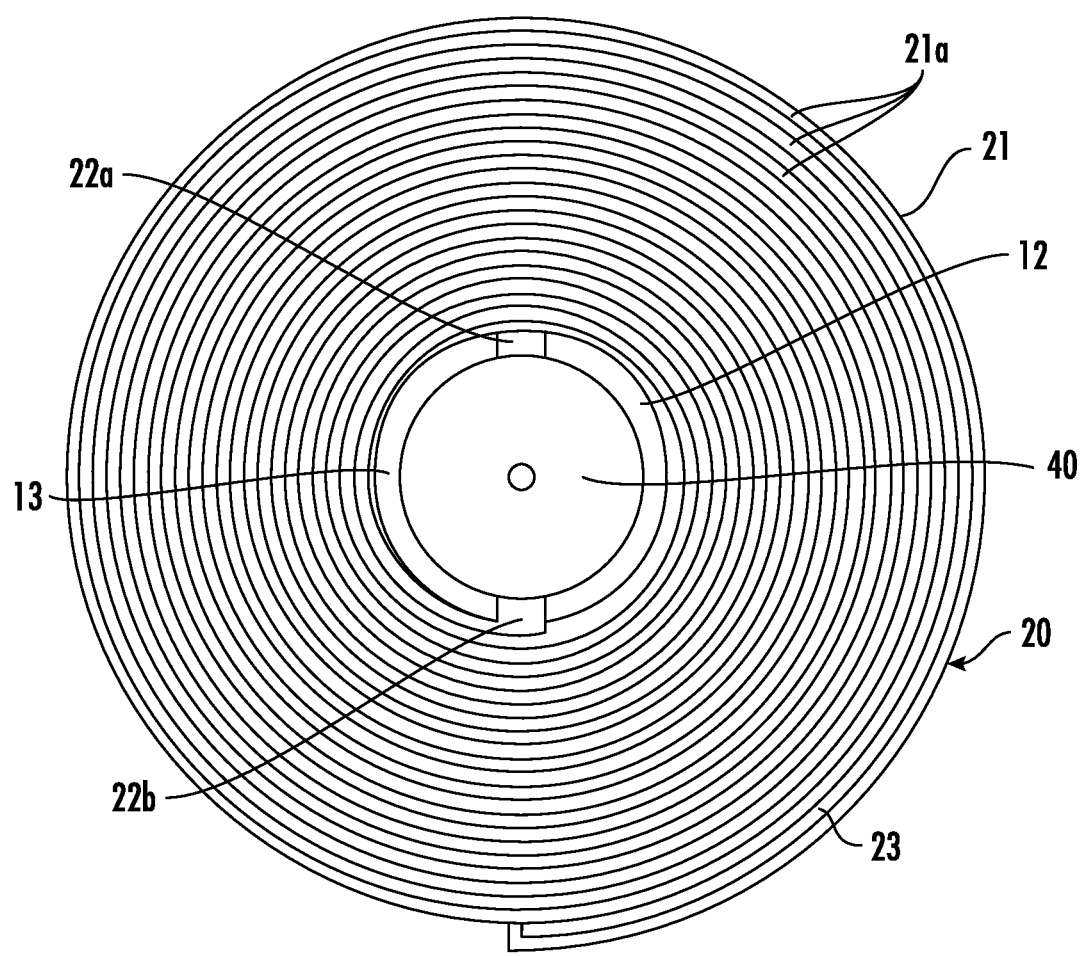
FIG. 1B is a transverse cross-section of the electromagnetic accelerator system shown in FIG. 1A housing a projectile according to various embodiments described herein.

With reference to FIG. 1A, illustrating a longitudinal cross-section of an electromagnetic accelerator system 10, and FIG. 1B, illustrating a transverse cross-section taken along line 2 in FIG. 1A, the accelerator system 10 may include a barrel 12 comprising a bore through which a projectile 40 may be accelerated. The barrel 12 may include a barrel wall 13 having an exterior surface 14 and an interior surface 15. The interior surface 15 may extend along a length of the barrel 12 and define a longitudinally extending bore including an acceleration path 16 along which a projectile 40 may be guided during and/or after acceleration. For example, the interior surface 15 may comprise a projectile guide surface 17. The guide surface 17 may extend along a length sufficient to stabilize a desired trajectory of a projectile 40. It is to be appreciated that while the illustrated embodiments generally include a barrel 12 through which the acceleration path extends, in some embodiments, the acceleration path may not extend along a barrel 12 but rather merely extend through a core of one or more electromagnetic cores or along an open structure. In one embodiment, the projectile 40 may be guided by magnetic or electromagnetic fields during or following acceleration.

The barrel wall 13 preferably comprises non-magnetic and non-metallic material. For example, the barrel wall 13 may be constructed of a ceramic, carbon, or carbon/ceramic composite material. The interior surface 15 may comprise a same or different material than the wall 13 and preferably comprises a material with low friction coefficient. For example, the interior surface 15, which may generally include the guide surface 17, may comprise ceramic, carbon, or carbon/ceramic composite material. In one embodiment, the guide surface 17 comprises a coating or layer of a non-magnetic, non-metallic material with a low friction coefficient comprising a ceramic, e.g., a carbon fiber/ceramic composite material.

Further to the above, the guide surface 17 typically comprises a smooth surface that extends completely around an interior perimeter of the interior surface 15. However, in some embodiments, one or more gaps may be formed along the interior surface 15 between adjacent portions of the guide surface 17 portions. For example, in some embodiments, one or more vent holes 19 may extend through the barrel wall 13. One or more vent holes 19 may be longitudinally spaced to expel compressed air in front of the travel of the projectile 40 and to allow venting of outside air into negative pressure created behind projectile 40 as it accelerates along the acceleration path 16 of the barrel 12. Size, location, and number of ventilation holes may vary generally determined by relative sizes of the acceleration path 16 and projectile, available clearance between the interior surface 15 of the barrel 12 and projectile 40, velocity of the projectile, and air density. In some examples, vent holes 19 may be arcuate, circular, oblong, triangular, quadrilateral, or other geometric or non-geometric shape. In one embodiment, a barrel 12 includes vent holes comprising different shapes and/or sizes. As explained in more detail below, electromagnetic accelerator systems 10 may include multiple stages. In some such embodiments, one or more vent holes 19 may be located between adjacent stages. In some embodiments, electromagnetic accelerator systems 10 including only a single stage may be configured without a vent hole 19 along one or both longitudinal sides of the barrel 12 flanking the electromagnetic coil 21. In one variation, the interior surface 15 comprises a guide surface 17 along one or more first interior perimeter portions having dimensions that generally correspond to that of a projectile 40, e.g., limited or nominal clearance between corresponding surfaces such that the guide surface 17 may guide the projectile 40 when accelerated along the acceleration path 16, and one or more second interior perimeter portions having dimensions greater than corresponding dimensions of the projectile 40 to assist in equalization of air pressure between the front of the projectile 40 and behind the projectile, which may be in addition to or instead of vent holes 19. In one configuration wherein there exists a significant size differential between the interior cross-section of the barrel 12 and the projectile 40, vent holes 19 may be absent. In one embodiment, the accelerator system 10 is configured for submersible applications. In one such embodiment, barrel 12 does not include vent holes.

The interior perimeter of the barrel 12 may define any suitable cross-section shape. For example, the interior perimeter may define an arcuate, round, oval, triangular, square, or other geometric or non-geometric shape. Although of larger dimensions to provide clearance for the projectile 40 to move along the acceleration path 15, the cross-section shape of the interior perimeter and/or guide surface 17 may correspond to one or more dimensions of a projectile 40 cross-section shape that the guide surface 17 is configured to guide along the acceleration path 15. In the example provided in FIG. 1B, projectile 40 has a circular cross-section and the interior surface 15 of the barrel 12 defines a slightly larger but corresponding circular cross-section. While, in some embodiments, the interior cross-section dimensions of the guide surface 17 may approximately correspond with that of the projectile 40, such correspondence may not be required. For example, the projectile 40 may merely be of smaller diameter than that of the cross-section defined by the guide surface 17. Indeed, embodiments may be suitable for acceleration of amorphous projectiles such as gases or varying fields. The dimensions and/or composition of the projectile 40 should be of sufficient size and/or have conductive characteristics such that the accelerating current fires, e.g., arcs, between electrical contacts through the projectile.

The accelerator system 10 also includes one or more electrical assemblies 20. Each electrical assembly 20 may include an electromagnetic coil 21, a first electrical contact 22a, and a second electrical contact 22b. While only a single electrical assembly 20 is shown in the illustrated embodiment, this as well as other embodiments may include additional electrical assemblies 20, as described in more detail below.

An electromagnetic coil 21 includes a plurality of insulated windings 21a that extend around the barrel 12 or acceleration path 16. Electrical assemblies 20 preferably comprise electromagnetic coils 21 that are insulated, spirally wound conductors. For example, electromagnetic coils 21 may be spirally wound such that conductor windings 21a decrease in diameter toward the core. Thus, the windings 21a may be wound such that sequential windings 21a stack along a height dimension of the coil 21. This design imparts an inductance into each adjacent turn of the electromagnet greatly increasing electrical and, as such, electromagnetic capacity of the coil, hence, compounding the electromagnetic force created. In one embodiment, the coil 21 includes a parallel winding configuration wherein the conductor is coiled upon itself. For example, a first portion of the conductor may be coiled from an outer winding to an inner winding. The remaining or second portion of the conductor that extends from the inner winding may be rewound in parallel with the first portion of the conductor from the outer winding to the inner winding, which may be in a manner similar to that described in U.S. Pat. No. 512,340, which is incorporated herein by reference. The conductor is preferably a flat or ribbon conductor.

Electromagnetic coils 21 may comprise a conductor 23 having various cross-section shapes, such as round, rectangular, or other geometric or non-geometric shape. In the illustrated embodiment, the electrical assembly 20 include an electromagnetic coil 21 comprising insulated spirally wound flat conductors 23 of ribbon like profile having widths dimensions larger than height dimensions. A conductor of flat, ribbon like profile offers great efficiency by carrying more current in less cross-section depth on the Y axis, thereby increasing current capacity and, hence, electromagnetic capacity. A type of wound electromagnets having round conductors was addressed by Nikola Tesla in U.S. Pat. No. 512,340, which is incorporated herein by reference. However, the type of coil addressed in U.S. Pat. No. 512,340 does not utilize flat conductors and is not known for use in an electromagnetic apparatus for propelling projectiles, nor any other type of electromagnetic accelerator.

In the illustrated embodiment, the electromagnetic coil 21 is positioned around the barrel wall 13 such that the acceleration path 16 positions within the core of the electromagnetic coil 21. As described in more detail below, the accelerator system 10 may include multiple electromagnetic coils 21 positioned along the length of the barrel 12 corresponding to at least a portion of the acceleration path 16. Such electromagnetic coils 21 may comprise stages through which a projectile 40 is sequentially accelerated. In various embodiments, electromagnetic shielding may be positioned around one or more electromagnetic coils 21 to electromagnetically isolate electromagnetic coil 21, e.g., when electromagnetic pulse may be of issue. Electromagnetic shielding may be passive, e.g., materials that absorb electromagnetic fields, or active. In one example, one or more reverse wound electromagnets may be placed on the X axis, adjacent to one or more electromagnetic coils 21, sandwiching the electromagnetic field and thereby canceling out its penetrative depth beyond the inside of the barrel 12 along the acceleration path 16. The accelerator system 10 may also include kinetic energy absorbing insulation. For example, kinetic energy absorbing insulation, such as a carbon fiber/silicone rubber composite material, may be positioned around an exterior surface of the barrel 12 and/or around electromagnetic coils.

The barrel 12 wall 13 may include a plurality of contact holes 18a, 18b into which electrical contacts 22a, 22b may be positioned. A first hole 18a may house the first electrical contact 22a and a second hole 18b may house the second electrical contact 22b. The barrel wall 13 may be configured to electrically insulate the electrical contacts 22a, 22b along the wall 13. As introduced above, the wall 13 may comprise a non-conductive, non-metallic material such as a ceramic, carbon, or carbon/ceramic composite material. The electromagnetic coil 21 may position around the barrel 12 over the first and second holes 18a. 18b. Thus, in some embodiments, the first and second holes 18a, 18b and the first and second electrical contacts 22a, 22b may be positioned within or approximately within the core of the electromagnetic coil 21.

The electrical contacts 22a, 22b preferably comprise conductive material, e.g., a metal, dissimilar to that of the projectile 40 to prevent high voltage welding between the electrical contacts 22a, 22b and the projectile 40. The electrical contacts 22a, 22b are preferably formed from a high wearing metal such as noble metal. In one example, electrical contacts 22a, 22b comprise rhodium. In one embodiment, the electrical contacts 22a, 22b may be contoured to correspond with surface or surface curvature of the interior surface 15 of the barrel 12. The electromagnetic coil 21 may electrically couple to the first electrical contact 22a and be electrically coupleable, e.g., across a projectile 40, to the second electrical contact 22b. The second electrical contact 22b is preferably positioned at a location opposed about 180 degrees to the first electrical contact 22a such that an electromagnetic point charge induced in the projectile upon discharge of the capacitor 35 is centered in the projectile.

The accelerator system 10 may include or be coupleable to a power supply to feed electrical contacts 22a, 22b. In various embodiments, the power supply comprises one or more capacitors 35 to provide a supply of power to the one or more electrical assemblies 20. While various embodiments are generally described herein with respect to utilization of a power source including a capacitor, those having skill in the art will appreciate that the supply of power may be provided by a power source 35 that does not include a capacitor. The supply of power supplied to the one or more coils and electrical contacts will typically be DC current. Thus, in various embodiments, the power source 35 comprises a DC power source configured to provide a supply of DC power. However, AC current may also be used. The one or more electrical assemblies 20 may electrically couple to the one or more capacitors 35, which may include multiple electrical assemblies 20 that couple to one or more same or different single or groups of capacitors 35, e.g., capacitor banks, to feed power to each electromagnetic coil 21. The one or more capacitors 35 may be of suitable, such as large, capacity depending on the desired power output.

The second electrical contact 22b may position at a location along the acceleration path 16 of the barrel 12 such that a projectile 40 moving along through the interior of the barrel 12 contacts both the first and second electrical contacts 22a, 22b to complete a circuit, allowing the electromagnetic coil 21 to discharge from the first electrical contact 22a, through the projectile 40, to the second electrical contact 22b to accelerate the projectile 40 by Lorentz Force.

Each electrical assembly 20 may also include a terminal 25 for electrical coupling between a negative pole 36 of one or more capacitors 35, the electromagnetic coil 21, and a respective first electrical contact 22a. Electrical assemblies 20 may also include a terminal 26 for electrical coupling between a positive pole 37 of the one or more capacitors 35 and a respective second electrical contact 22b. Terminals 25, 26 may comprise suitable electrical conductive materials, such as copper for example. In embodiments with multiple electrical assemblies 20, one or more electrical assemblies 20 may share common terminals 26 for electrical coupling to positive poles 37 of respective capacitors 35.

In the illustrated embodiment, the electromagnetic coil 21 internal windings terminate at the first electrical contact 22a, which passes through the barrel wall 13, providing a contact point within the bore of the barrel 12 along the acceleration path 16. The electromagnetic coil 21 external windings terminate at terminal 25 for negative connection to the capacitor 35 via terminal conductor 27a. Radially, about 180 degrees from the first electrical contact 22a, the second electrical contact 22b passes through barrel wall 13 to provide another electrical contact point within the bore of the barrel 12 along the acceleration path 16. The second electrical contact 22b electrically couples to a ground conductor 27c including a terminal 26 for connection to the positive pole 37 of power source capacitor 35 via terminal conductor 27b. Thus, the positive pole 37 of the capacitor 35 may electrically couple to the terminal 26, e.g., along ground chassis, and the negative pole 36 of the capacitor 35 may electrically couple to the terminal 25. Conventional current flows from positive to negative. However, electron flow moves from negative to positive. Herein, current generally refers to electron flow. Thus, ground may refer to positive ground in this instance. Preferably, electrons flow from the outside/external windings of the electromagnetic coil to the center/internal windings. For instance, the negative pole 36 of the power supply/capacitor 35 may electrically couple to the electromagnetic coil 21, at terminal 25, and first electrical contact 22a and the positive pole 37 of the capacitor 35 may electrically couple to terminal 26 and electrical contact 22b. It may be noted, that polarity indices described above are opposite of standard indices that refer to current flow. It will be appreciated that, in some embodiments, the capacitor 35 pole connections may be reversed with respect to the terminals 25, 26. Polarity reversal may result in reversal of acceleration direction and reduction in efficiency.

As introduced above, the second electrical contact 22b is preferably positioned in opposition to the first electrical contact about 180 degrees (+/−5 degrees), or more preferably 180 degrees. In a barrel 12 having a circular interior cross-section, contact points placed 180 degrees in opposition allow for greater current capacity by maintaining the greatest available air gap between contacts 22a, 22b to allow for greater voltage potential of the electromagnetic coil 21 without shorting. The same may not be true for barrels 12 defining other interior cross-section shapes, such as non-geometric shapes. However, it is not necessary that electrical contacts 22a, 22b be placed at 180 degrees opposition if taking into account the voltage potential to be utilized and the dielectric breakdown voltage of operative air, which may be less in environments having salty air. Increasing interior cross-section dimensions may also be used to increase available design voltage potential. Placing electrical contacts 22a, 22b about 180 degrees in opposition may also increase alignment characteristics with respect to the projectile point charge at the projectile center created by the power supply/capacitor 35 discharge and that of the electromagnetic point charge created by the electromagnetic coil 21 along the longitudinal center of the acceleration path 16. While the angle between the first and second contacts 22a, 22b may be less than about 180 degrees in some embodiments, the deviation from about 180 degrees may be accompanied by a reduction in the efficiency of energy transfer to the projectile 40 due to offset alignments of electromagnetic point charges.

The electrical contacts 22a, 22b are preferably approximately aligned longitudinally with respect to the length of the barrel 12. For example, the first and second electrical contacts 22a, 22b are preferably positioned within a transverse plane normal to the acceleration path 16. However, in some embodiments, the first electrical contact 22a may be longitudinally offset from the second electrical contact 22b. For example, the first electrical contact 22a may be positioned along the acceleration path at position that is forward of a position of the second electrical contact 22b with respect to the acceleration path 16. The degree of allowable offset may be such that the projectile 40 may complete the circuit between the electrical contacts 22a, 22b when positioned therebetween.

The electrical contacts 22a, 22b are preferably positioned within the core of the electromagnetic coil 21 to optimize efficiency. In some embodiments, however, the first and/or second electrical contact 22a, 22b may be offset longitudinally from the core. For example, the first electrical contact 22a and the second electrical contact 22b may be positioned forward or rear of the core with respect to the acceleration path 16. The degree of allowable offset may be to an extent to where the electromagnetic field generated by the electromagnet remains strong enough to accelerate the projectile 40 by Lorentz Force to achieve sufficient velocity to exit the barrel 12.

The accelerator system 10 may be configured to propel projectiles 40 of any reasonable size. For example, projectiles 40 may range in size from as small as a subatomic particle to several inches or many feet in diameter depending on size of barrel 12. In various embodiments, the projectile may comprise a conductive material. While projectiles 40 having high resistivity may also be utilized, use of projectiles 40 having high conductivity will typically be accelerated more efficiently. For example, an aluminum projectile, having a conductivity of $3.5 \times 10^7$ σ (S/m) may be accelerated more efficiently than air, having a conductivity of $3 \times 10^{-15}$ to $8 \times 10^{-15}$. In various embodiments, the projectile may comprise a metal or metal alloy. As noted above and elsewhere herein, the projectile may comprise a field or a fluid, e.g., a gas such as air or an ionized gas. It will be appreciated that given enough power, projectiles having even minuscule conductivity may be used.

In an operation, a projectile 40 of smaller diameter than the interior of the barrel 12 may be fed into the barrel 12 for acceleration along the acceleration path 16. When the projectile 40 makes contact between electrical contacts 22a, 22b, closing a circuit therebetween, the capacitor discharges through the electromagnetic coil 21 and projectile 40 to accelerate the projectile via Lorentz Force. Thus, the projectile 40 may perform switching to initiate discharge from the capacitor 35. While the electromagnet discharge may be actively triggered by the projectile, e.g., triggered by an object, particle, or field, in some embodiments, the accelerator system 10 may utilize sensors that detect the object, particle, or field that then triggers discharge of the capacitor 35 through the projectile 40.

Figure 2:
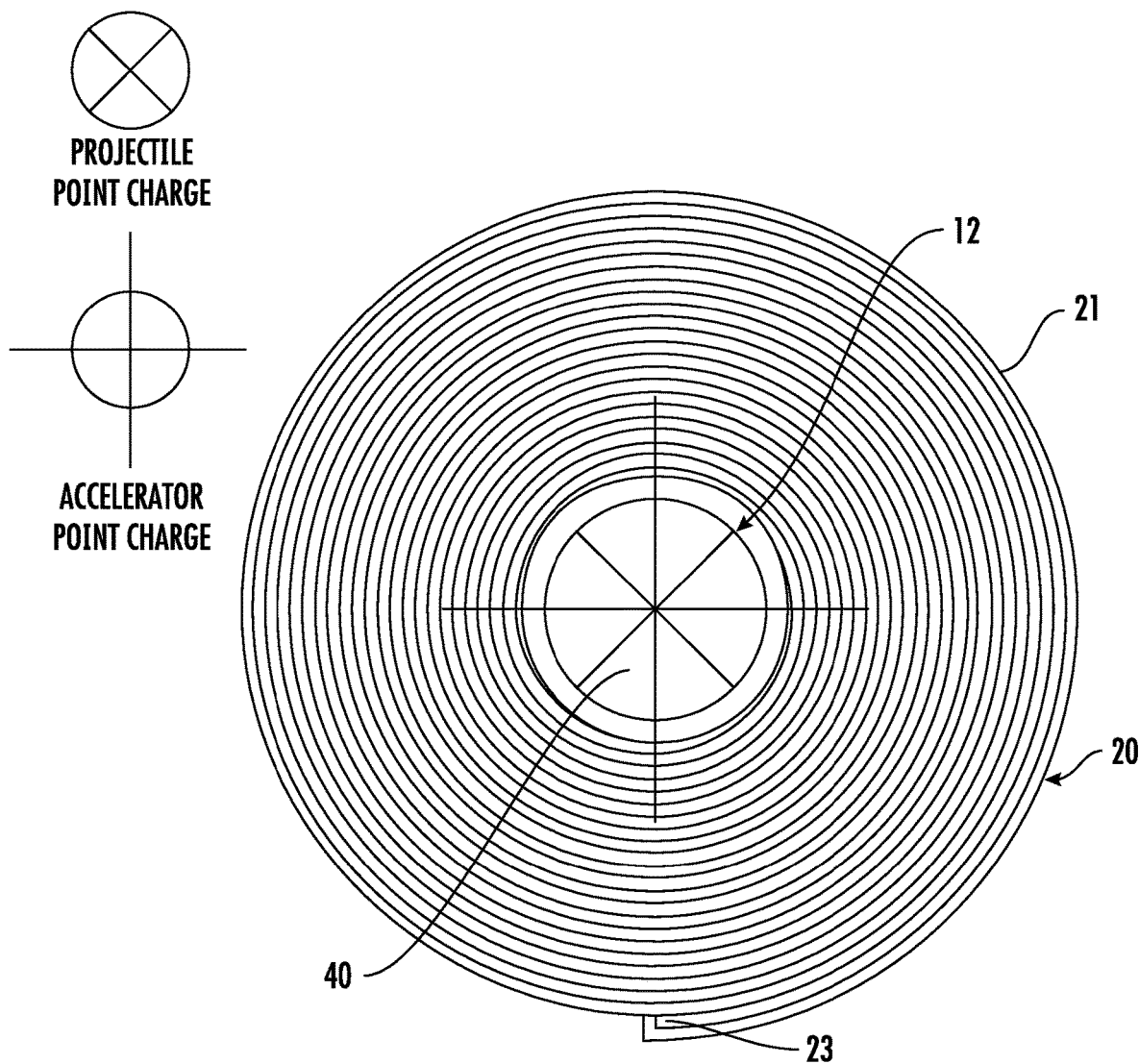
FIG. 2 is a transverse cross-section of an electromagnetic accelerator system schematically illustrating alignment of projectile and accelerator point charges arising during an acceleration operation of the electromagnetic accelerator system according to various embodiments described herein.

As introduced above, and with particular reference to FIG. 2, the accelerator system 10 may be configured to align point charges for efficient transfer of energy to the projectile 40. For example, the capacitor discharge causes an electromagnetic point charge in the projectile 40, at center of the projectile 40 between the electrical contacts 22a, 22b, as depicted by the small "x" within a circle in FIG. 2. The capacitor discharge also propagates the discharge current through the electromagnetic coil 21 generating an electromagnetic point charge, as depicted by cross-hairs in FIG. 2, concentrated to the longitudinal center of the barrel 12. Point charges are strongest in their centers. Both electromagnetic coil point charge and projectile point charge are therefore aligned to the center of the projectile 40 when the projectile is propelled by Lorentz Force. The above configuration results in an extremely efficient transfer of electromagnetic force into projectile 40, far superior to that of railgun and/or coil gun designs.

FIGS. 1A & 1B illustrates a single electromagnetic coil 21, however, as noted above, the accelerator system 10 may include a plurality of electromagnetic coils 21 positioned along the barrel 12. For example, the embodiment illustrated in FIGS. 1A & 1B may comprise a stage of the accelerator system 10 wherein the accelerator system 10 includes a plurality of sequential stages of similar or different configuration along a length of the barrel 12. In embodiments with multiple electrical assemblies 20, the electromagnetic coils 21 may be spaced apart along a length of the barrel 12, preferably at regular intervals; however, in some configurations spacing intervals may be irregular.

Figure 3:
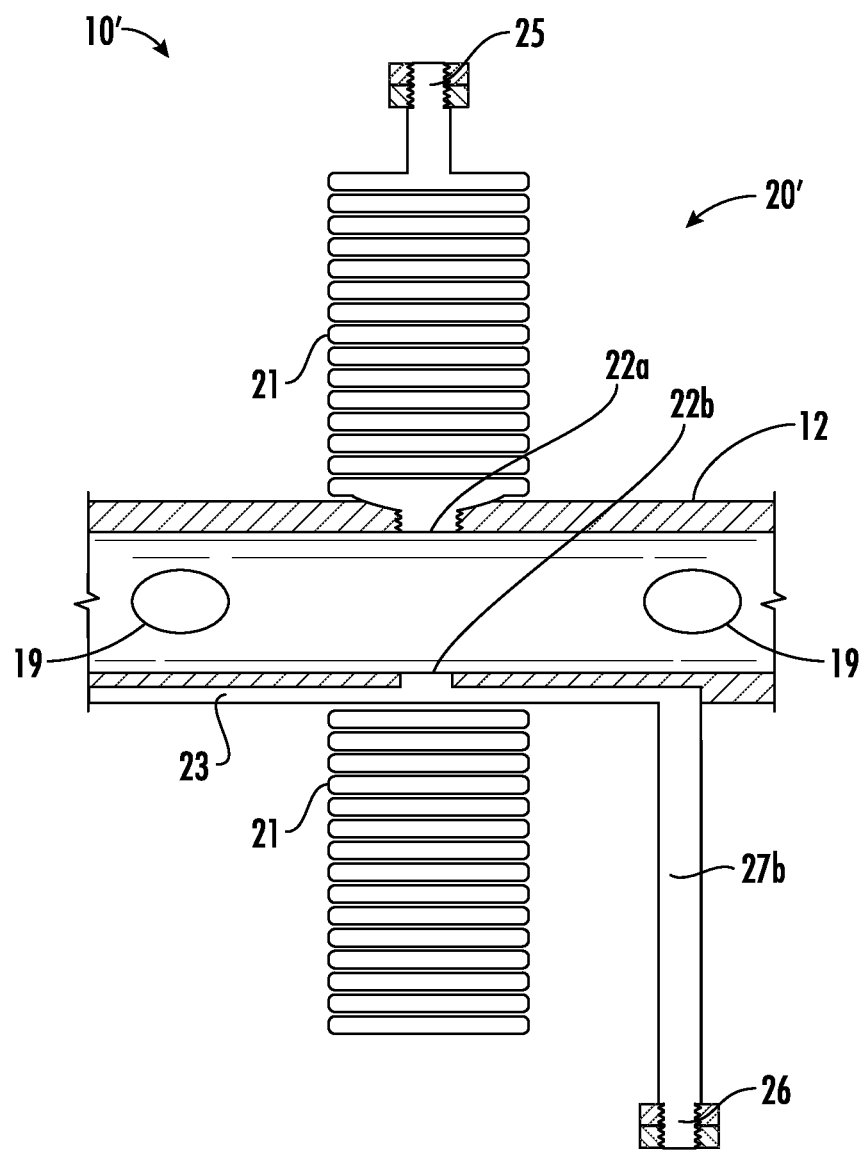
FIG. 3 is a longitudinal cross-section of a portion of an accelerator system including a common ground conductor path according to various embodiments described herein.

FIG. 3 illustrates a longitudinal cross-section view of a portion of an accelerator system 100 that is similar to accelerator system 10 showing additional or alternative features to those described above with respect to FIGS. 1A & 1B, wherein like features are identified with like numbers. Specifically, the electrical assembly shown with respect to accelerator system 10 includes an individual ground terminal connector while the electrical assembly 20' shown in FIG. 3 includes a common ground 27a with one or more additional electrical assemblies (not shown). Thus, accelerator system 100 may include at least two electrical assemblies wired in parallel with one or more capacitors (not shown). Notably, the electrical assembly shown in FIGS. 1A & 1B may still be wired in parallel with additional electrical assemblies.

As introduced above, the accelerator system may include or be configured to couple to one or more capacitors or capacitor banks, each comprising one or more capacitors. For example, a first capacitor bank may comprise one or more first capacitors for electrically coupling to one or more first electrical assemblies and a second capacitor bank may comprise one or more second capacitors for electrically coupling to one or more second electrical assemblies.

FIGS. 4-9 illustrate various configurations of electrically coupling one or more capacitors to electrical assemblies of an accelerator system 100 comprising a multistage accelerator wherein like numbers identify like features.

Figure 4:
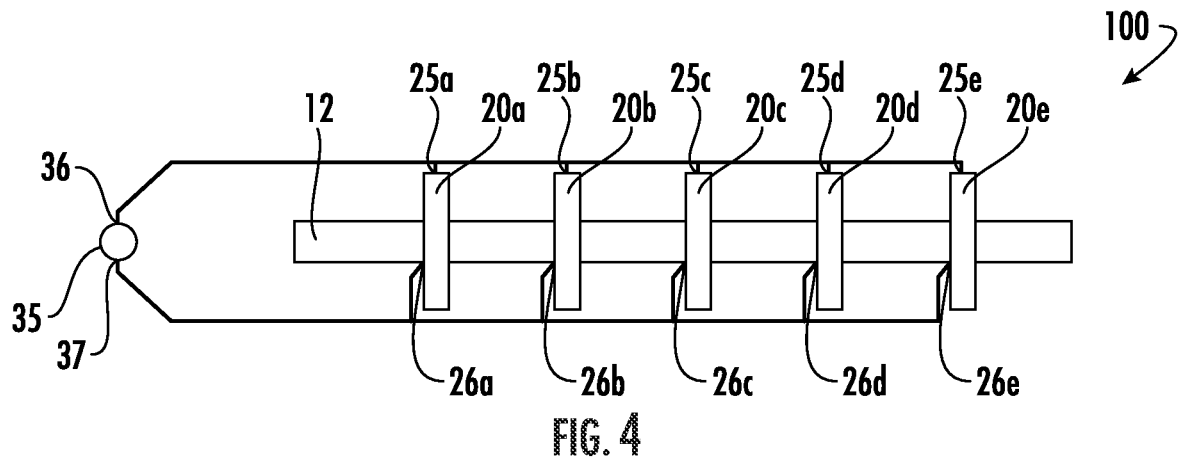
FIG. 4 schematically illustrates an accelerator system including a capacitor electrically coupled to parallel electrical assemblies according to various embodiments described herein.

FIG. 4 is an example of the accelerator system 100 including a capacitor 35 wherein the negative pole 36 of the capacitor 35 is electrically coupled to terminals 25a-25e of electrical assemblies 20a-20e positioned along barrel 12 and the positive pole 37 of the capacitor 35 is electrically coupled to terminals 26a-26e of the electrical assemblies 20a-20e. Thus, in this configuration, parallel electrical assemblies 20a-20e are electrically coupled to a single capacitor 35.

Figure 5:
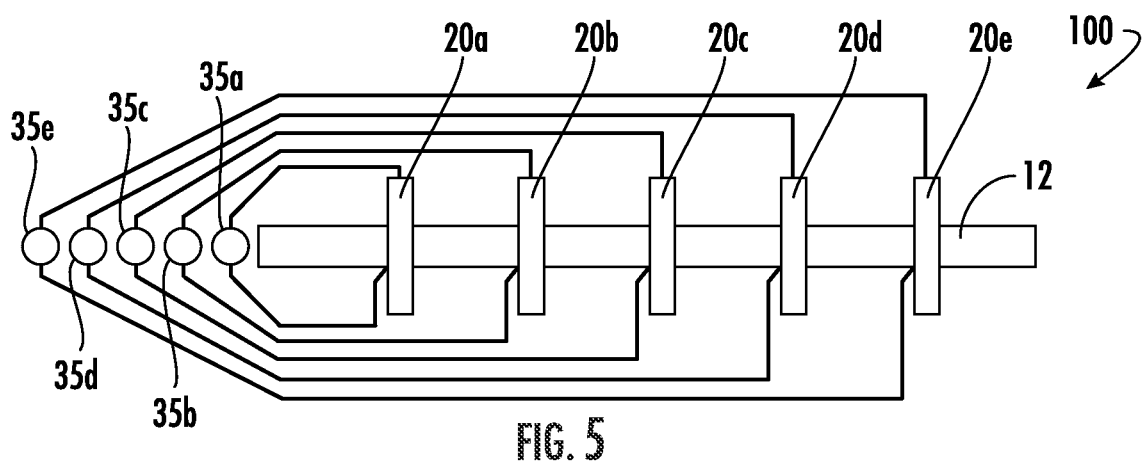
FIG. 5 schematically illustrates an accelerator system including a plurality of capacitors wherein each of the electrical assemblies is electrically coupled to a separate capacitor according to various embodiments described herein.

FIG. 5 is an example of the accelerator system 100 including capacitors 35a-35e wherein each capacitor 25a-35e is electrically coupled to a respective electrical assembly 20a-20e in a one-to-one relationship.

Figure 6:
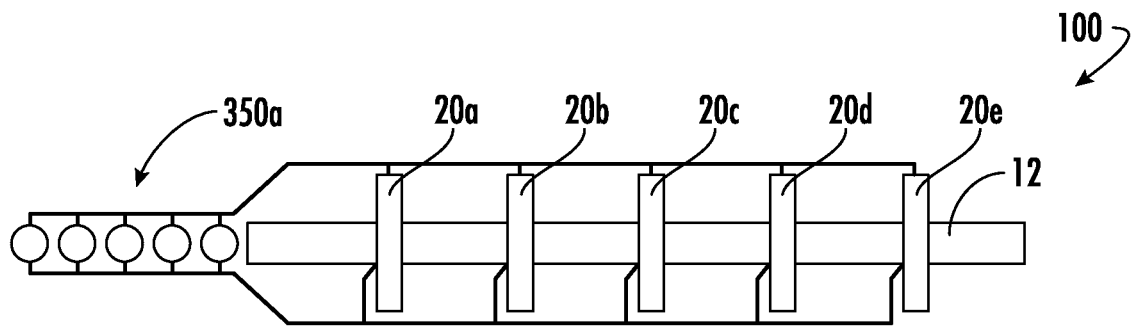
FIG. 6 schematically illustrates an accelerator system including parallel capacitors electrically coupled to parallel electrical assemblies according to various embodiments described herein.

FIG. 6 is an example of the accelerator system 100 including a capacitor bank 350a, comprising a plurality of capacitors electrically coupled in parallel, electrically coupled to parallel electrical assemblies 20a-20e.

Figure 7:
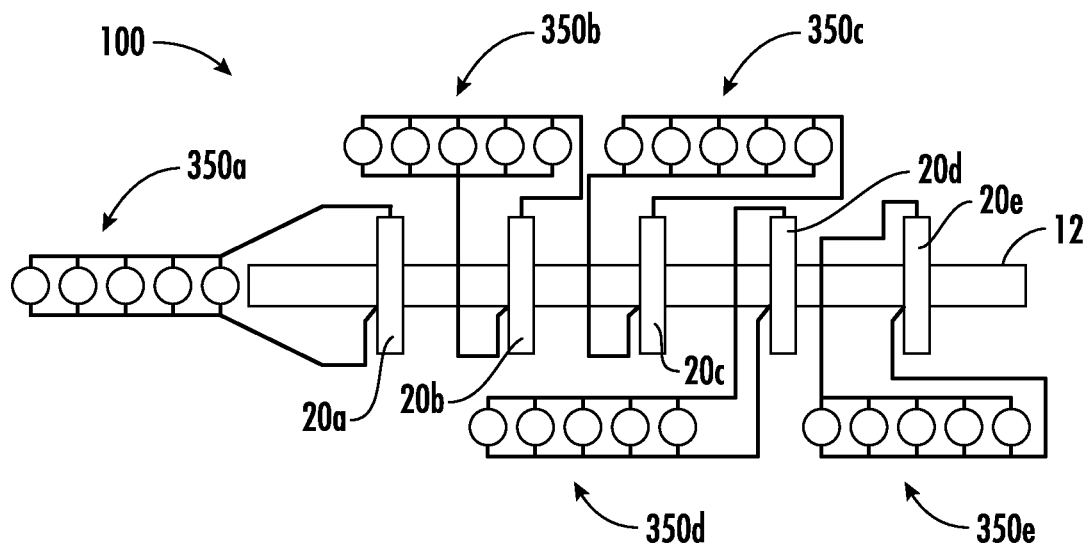
FIG. 7 schematically illustrates an accelerator system including a plurality of parallel capacitors wherein each electrical assembly is electrically coupled to a set of parallel capacitors according to various embodiments described herein.

FIG. 7 is an example of the accelerator system 100 including a plurality of capacitor banks 350a-350e, each comprising a plurality of capacitors electrically coupled in parallel, individually coupled to respective electrical assemblies 20a-20e.

Figure 8:
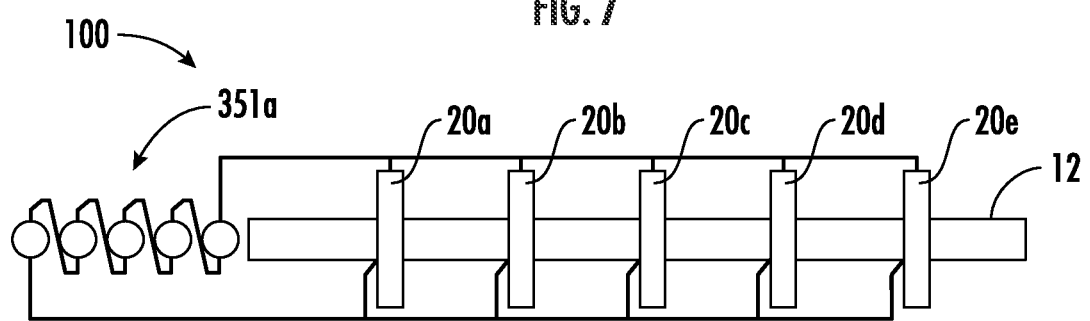
FIG. 8 schematically illustrates an accelerator system including series capacitors electrically coupled to parallel electrical assemblies according to various embodiments described herein.

FIG. 8 is an example of the accelerator system 100 including a capacitor bank 351a, comprising a plurality of capacitors electrically coupled in series, electrically coupled to parallel electrical assemblies 20a-20e.

Figure 9:
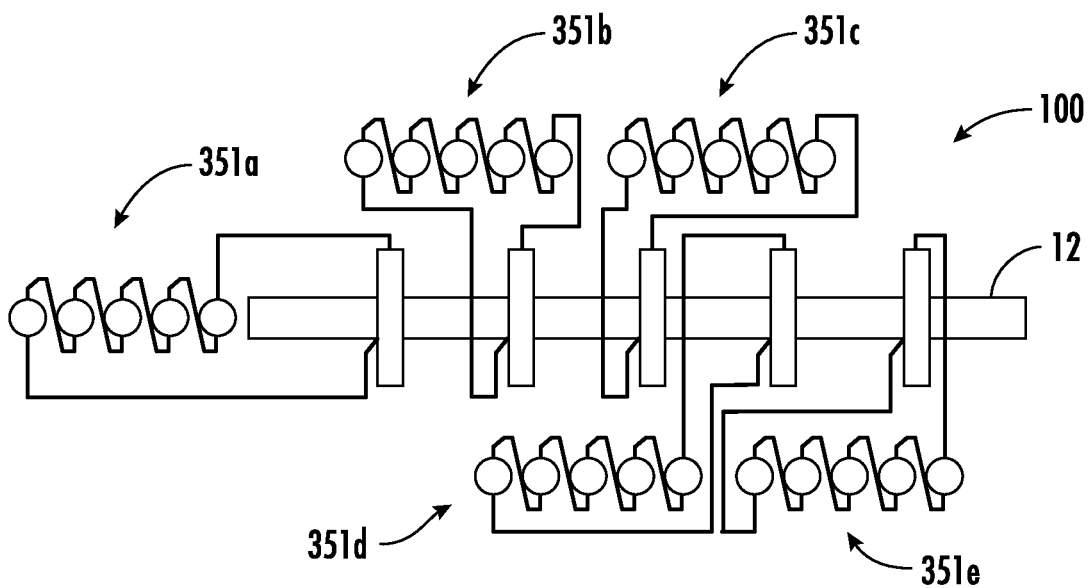
FIG. 9 schematically illustrates an accelerator system including a plurality of series capacitors wherein each of the electrical assemblies is electrically coupled to a separate set of series capacitors.

FIG. 9 is an example of the accelerator system 100 including a plurality of capacitor banks 351a-351e, each comprising a plurality of capacitors electrically coupled in series, individually coupled to respective electrical assemblies 20a-20e.

While FIGS. 4-9 illustrate various wiring configurations, those having skill in the art will appreciate that other wiring schemes may be used, including combinations of the examples provided herein. For example, a first set of two or more electrical assemblies may together electrically couple to a single capacitor and a second set of one or more electrical assemblies may electrical couple to two or more series or parallel capacitors. Numerous combinational variations may be implemented, any of which are to be considered part of the present disclosure.

FIGS. 10A & 10B illustrate cross-section views of a multistage barrel 12 and associated accelerator system components according to various embodiments. The barrel 12 may be similar to that described above with respect to FIGS. 1A & 1B. For example, the barrel 12 may comprise non-magnetic and non-metallic material. The interior surface 15 and/or guide surface 17 may comprise a low friction coefficient material and extend along a sufficient length to stabilize a trajectory of a projectile. In one example, the barrel 12 may be constructed from a ceramic or carbon/ceramic material. The barrel 12 includes holes 18a regularly, longitudinally spaced for housing electrical contacts 22a, e.g., negative contact points. The barrel 12 also includes holes 18b about 180 degrees radially from holes 18a for receiving electrical contacts 22b, e.g., positive contact points. Electrical contacts 22a are shown positioned in holes 18a, while electrical contacts 22b are shown positioned in holes 18b. The electrical contacts 22a, 22b are contoured to correspond with a curvature of the interior surfaces 15 adjacent to the respective electrical contacts 22a, 22b. The illustrated barrel 12 is fitted with a common ground terminal conductor 27c, which may be utilized for parallel wiring of electrical assemblies. As introduced above, the electrical contacts 22a, 22b may be of dissimilar material to that of a projectile to prevent high voltage welding. Electromagnetic coils (not shown) may be positioned around the barrel 12, preferably over each pair of holes 18a, 18b; however, in one embodiment, an electromagnetic coil is offset from a pair of holes 18a, 18b corresponding electrical contacts the electromagnetic coil electrically couples. Vent holes 19 are longitudinally spaced between holes 18a, 18b to expel compressed air in front of a projectile's travel and to allow venting of outside air into negative pressure created behind the projectile. The vent holes 19 are illustrated as being about 90 degrees from holes 18a, 18b; however, in other embodiments, vent holes 19 may be located at additional or different locations. Vent holes 19 may comprise various sizes and shapes, for example, vent holes 19 may be arcuate, circular, oblong, triangular, quadrilateral, or other geometric or non-geometric shape. In one embodiment, a barrel 12 includes vent holes comprising different shapes and/or sizes. In the illustrated embodiment, vent holes 19 of circular shape and positioned between adjacent electrical contact pairs 22a, 22b. In some embodiments, more than two vent holes 19 may be provided between adjacent electrical assemblies.

Figure 11A:
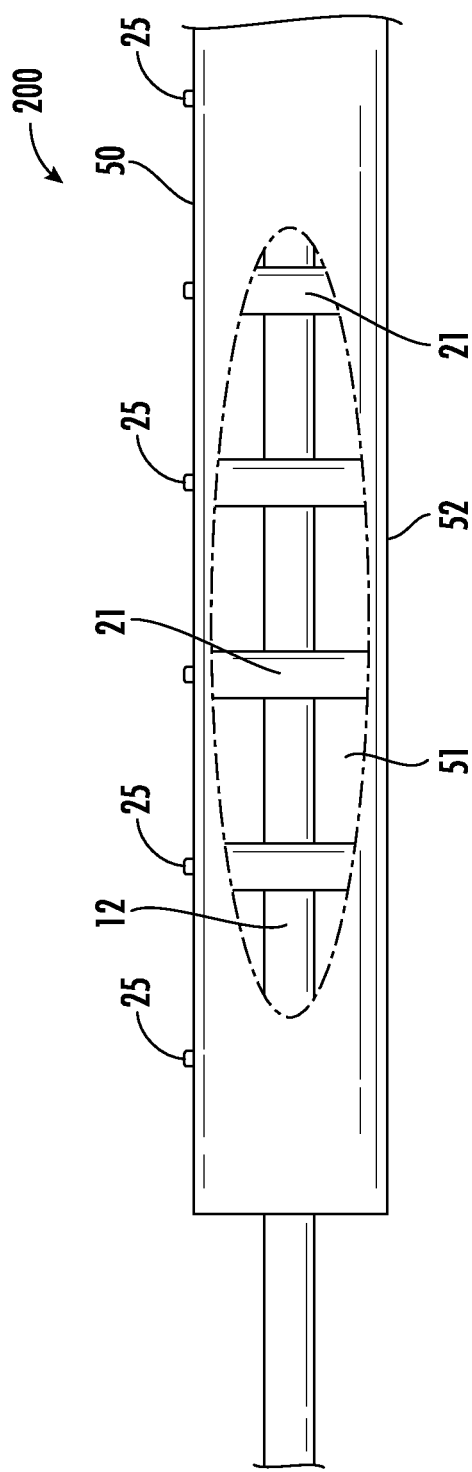
FIG. 11A is a partial cutaway view through a shell of an accelerator system according to various embodiments described herein.
Figure 11B:
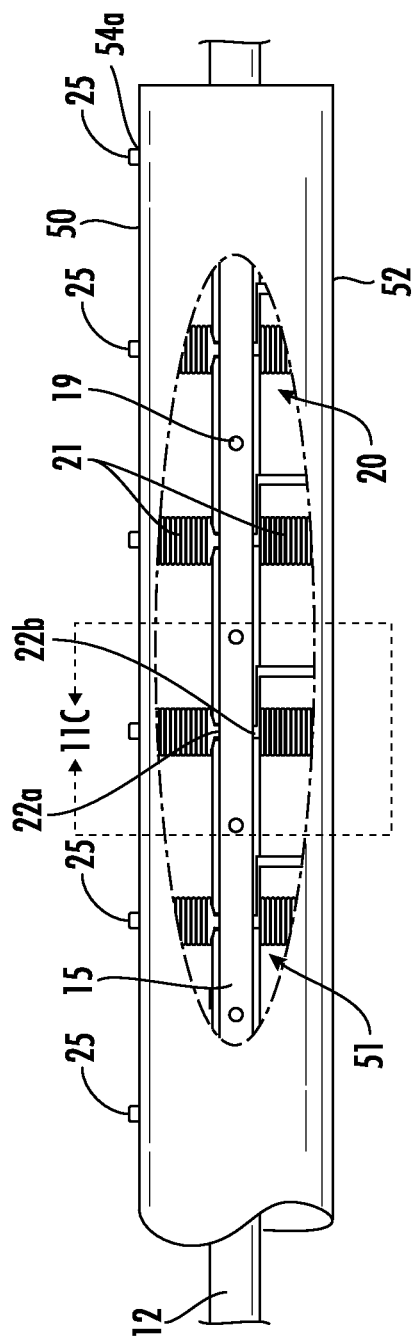
FIG. 11B is a partial cutaway view through the shell of the accelerator system in FIG. 11A wherein the cutaway provides a longitudinal cross-section view according to various embodiments described herein.

FIGS. 11A-11B illustrate various cutaway and cross-section views of an accelerator system 300 according to various embodiments. Accelerator system 300 may be similar to accelerator systems 10, 10', 100 described above. For example, accelerator system 300 may include or be electrically coupled to one or more capacitors as described elsewhere herein. Accelerator system 300 comprises six stages corresponding to six electrical assemblies 20, each comprising an electromagnetic coil 21 and electrical contacts 22a, 22b. In operation, a projectile may act as a switch to sequentially close circuits between electrical contacts 22a, 22b of each stage as it moves along the acceleration path 16 of the barrel 12 causing discharge of one or more electrically coupled capacitors having electromagnetic point charges concentrated to the longitudinal center of the barrel 12 and causing electromagnetic point charges in the projectile that are preferably aligned with the longitudinally centered point charges produced by the electromagnetic coils 21 to sequentially accelerate the projectile along the acceleration path 16.

Figure 11C:
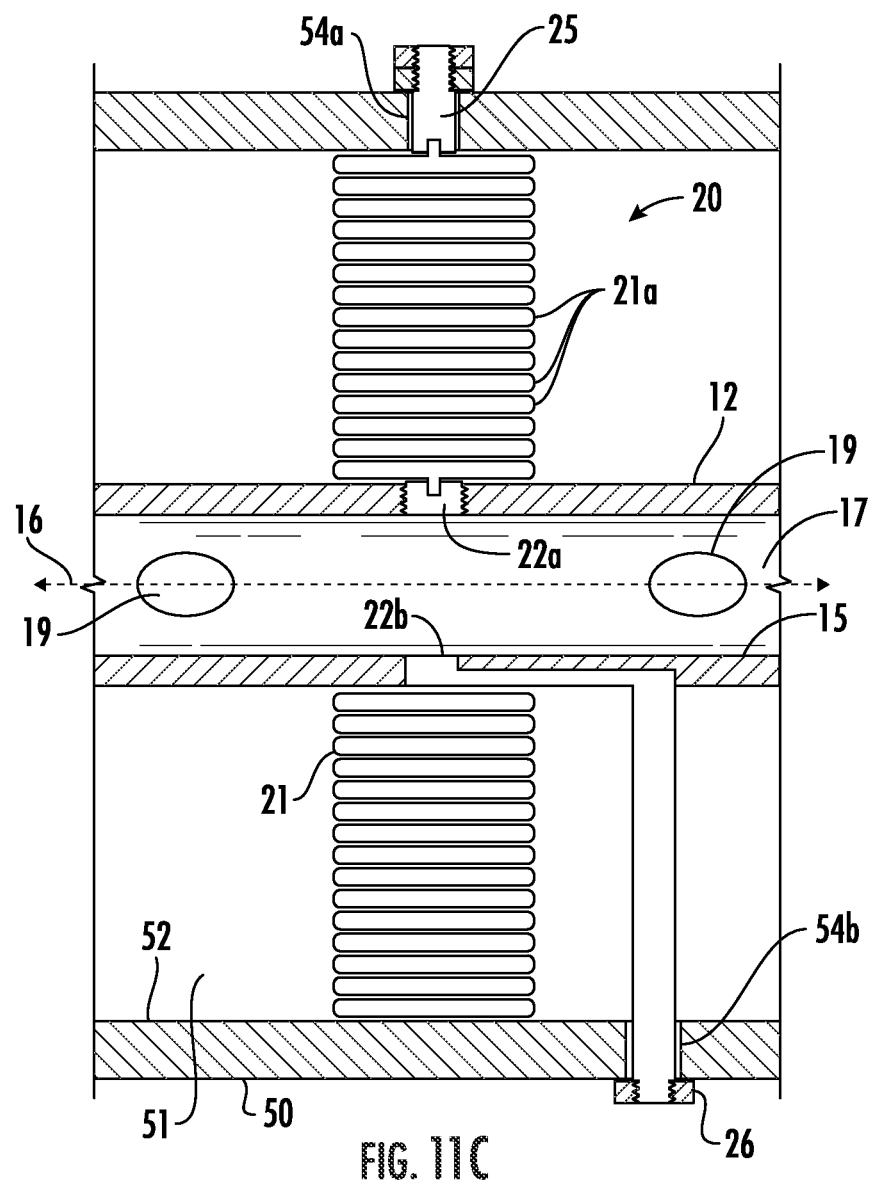
FIG. 11C is a longitudinal cross-section of an isolation view of the accelerator system in FIGS. 11A & 11B taken from box 11C in FIG. 11B according to various embodiments described herein.

Accelerator system 300 is also shown fitted with an optional shell 50 that houses the barrel 12 and one or more electronic assemblies 20. The shell 50 may include a wall 52 that extends around the barrel 12 and electronic assemblies 20 and be of sufficient strength and modulus to enclose the electromagnetic coil 21 and barrel 12 within interior space 51 of the shell 50. The wall 52 of the outer shell 50 may also include holes 54a, 54b through which terminals 25, 26 may be provided for connection with one or more capacitors, e.g., via terminal conductors. In the illustrated embodiment, terminal 25 extends through the wall 52 at hole 54a. The isolated view provided in FIG. 11C illustrates terminal 26 extending through hole 54b. The outer shell 50 may comprise various cross-section shapes. The cross-section shapes may be the same or different than that of the barrel 12. In various embodiments, one or more tracking devices, aiming devices, and/or monitoring devices may mount to the outer shell 50.

In various embodiments with multiple electrical coils 21, the outer shell 50 may include a hole 54a for a terminal 25 of each electrical assembly 20. Holes 54a may be regularly or irregularly, longitudinally spaced along the wall 52 for negative electrical contact at the outside windings of electromagnetic coils 21 for feeding a supply of power. Holes 54b may be regularly, longitudinally spaced and/or may be about 180 degrees radially from holes 54a. The outer shell 50 may include one or more holes 54b through which one or more terminals 26 may extend. In some embodiments, the outer shell 50 may include a pair of holes 54a, 54b for each coil 21 or may provide fewer than a one-to-one relationship, e.g., fewer holes 54b may be provided for common ground configurations. In various embodiments, terminals 25, 26 may be detachable for ease of assembly, removal, and/or replacement.

Figure 12:
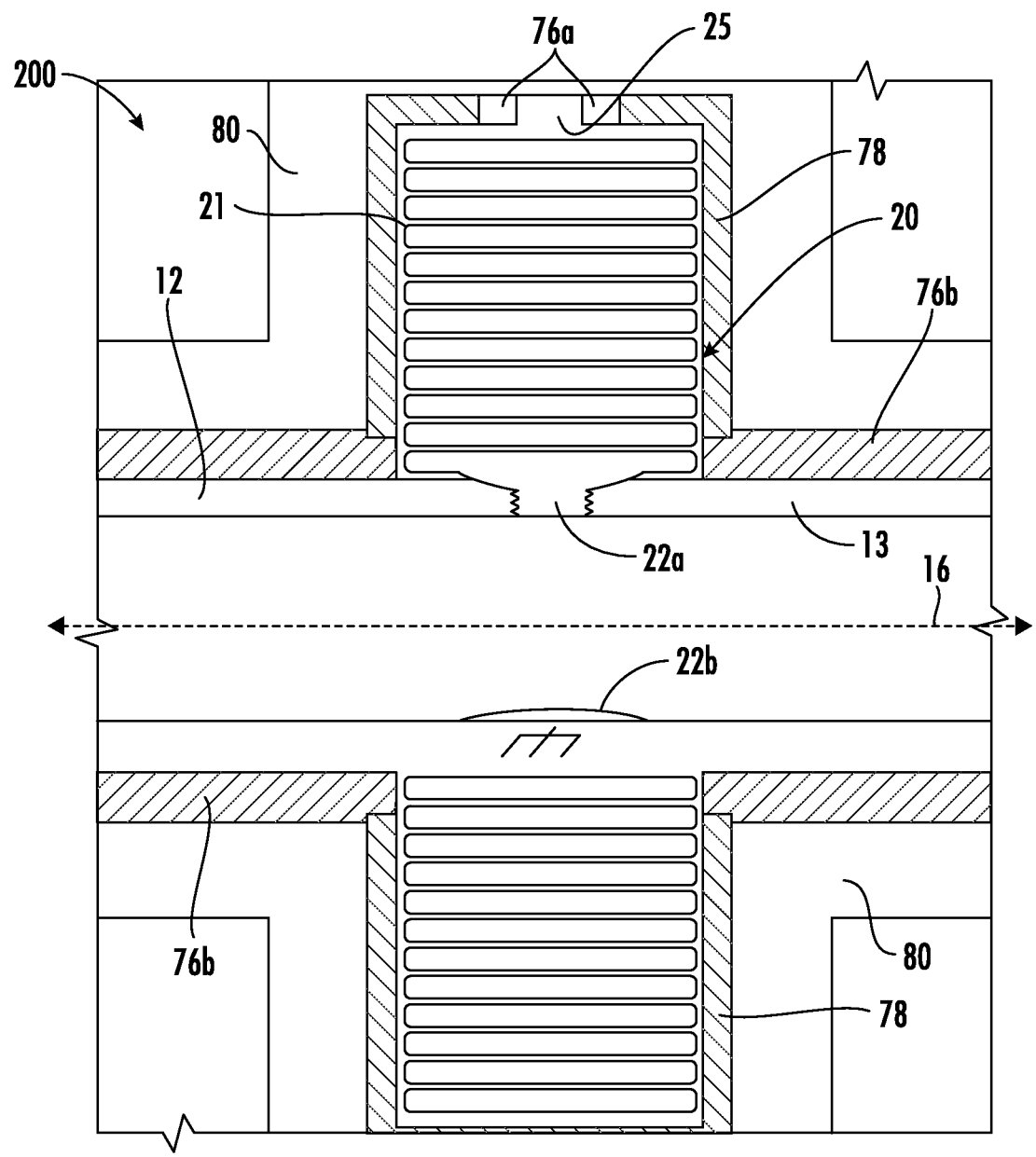
FIG. 12 is a longitudinal cross-section of an accelerator system including kinetic energy absorbing insulation, electromagnetic shielding, and a stage housing according to various embodiments described herein.

FIG. 12 illustrates an example accelerator system 200, which may be similar to accelerator system 10 described above with respect to FIGS. 1A & 1B, that includes optional kinetic energy absorbing insulation 76a, 76b and optional electromagnetic shielding 76. Kinetic energy absorbing insulation 76a may be positioned within hole 54a of the outer shell 50. The kinetic energy absorbing insulation 76a may absorb energy from vibrations and/or motion forces of the barrel 12 during operation. Various embodiments may additionally or alternatively include kinetic energy absorbing insulation within hole 54b (see FIG. 11C). Electromagnetic shielding 78 is positioned around the electromagnetic coil 21 to electromagnetically isolate the field generated by the electromagnetic coils 21 to the interior of the barrel 12. In the illustrated embodiment, the electromagnetic shielding 78 comprises passive shielding; however, as described above, in some embodiments, electromagnetic shield may be active.

In some embodiments, the accelerator system may include an optional stage housing 80 that encloses an electromagnetic coil 21. The stage housing 80 may further enclose electromagnetic shielding 78. The stage housing 80 may also house all or a portion of the barrel 12. In one embodiment, the accelerator system 200 includes a plurality of electromagnetic coils 20, each enclosed by a stage housing 80 between a shell and the barrel 12. In a further embodiment, the stage housing 80 may enclose a length of the barrel 12 between adjacent stages. The stage housing 80 may be continuous along the length of the barrel 12 such that intervening barrel lengths between stages are enclosed by the stage housing 80. In one embodiment, the stage housing 80 comprises carbon fiber. The stage housing 80 may interface with a shell or include one or more holes through which terminal 25 and/or terminal 26 may extend. In the illustrated embodiment, the stage housing 80 encloses the electromagnetic coil 20 and kinetic energy absorbing insulation 76b is positioned between the stage housing 80 and the barrel 12 to absorb kinetic energy imparted to the barrel 12 during operation. The stage housing 80 further encloses the electromagnetic shielding 66 that is positioned around the electromagnetic coil 21.

Figure 13:
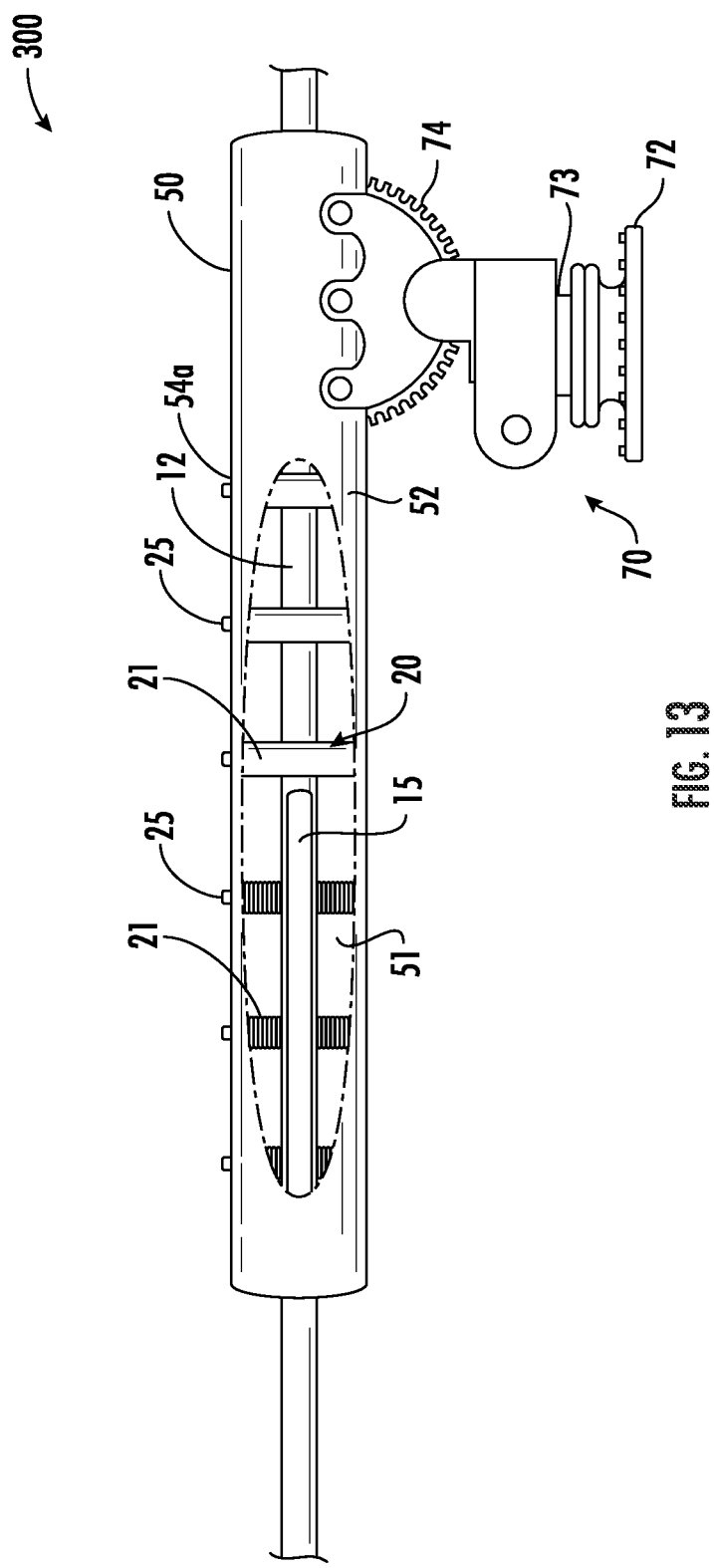
FIG. 13 is a partial cutaway view through a shell of an accelerator system wherein a forward portion of the cutaway provides a longitudinal cross-section view according to various embodiments described herein.

In various embodiments, the accelerator system includes or is configured to attach to a targeting mount for manipulating and/or stabilizing the accelerator system. For example, FIG. 13 illustrates accelerator system 300, shown in partial cutaway views, as described with respect to FIGS. 11A-11C attached to a targeting mount 70. The targeting mount 70 includes a base 72 suitable for attachment to a surface for stabilizing the barrel 12 or for human shoulder carry portability. The barrel 12 is of sufficient length to stabilize projectile path depending on amount of force (current) used. The targeting mount includes a horizontal targeting pivot 73 for pivoting the accelerator system 300. The targeting mount further includes a vertical targeting pivot 74 comprising a pivot gear. The horizontal targeting pivot 73 and vertical targeting pivot 74 may be utilized by a user to easily pivot the accelerator system 300 to acquire a target.

Figure 14:
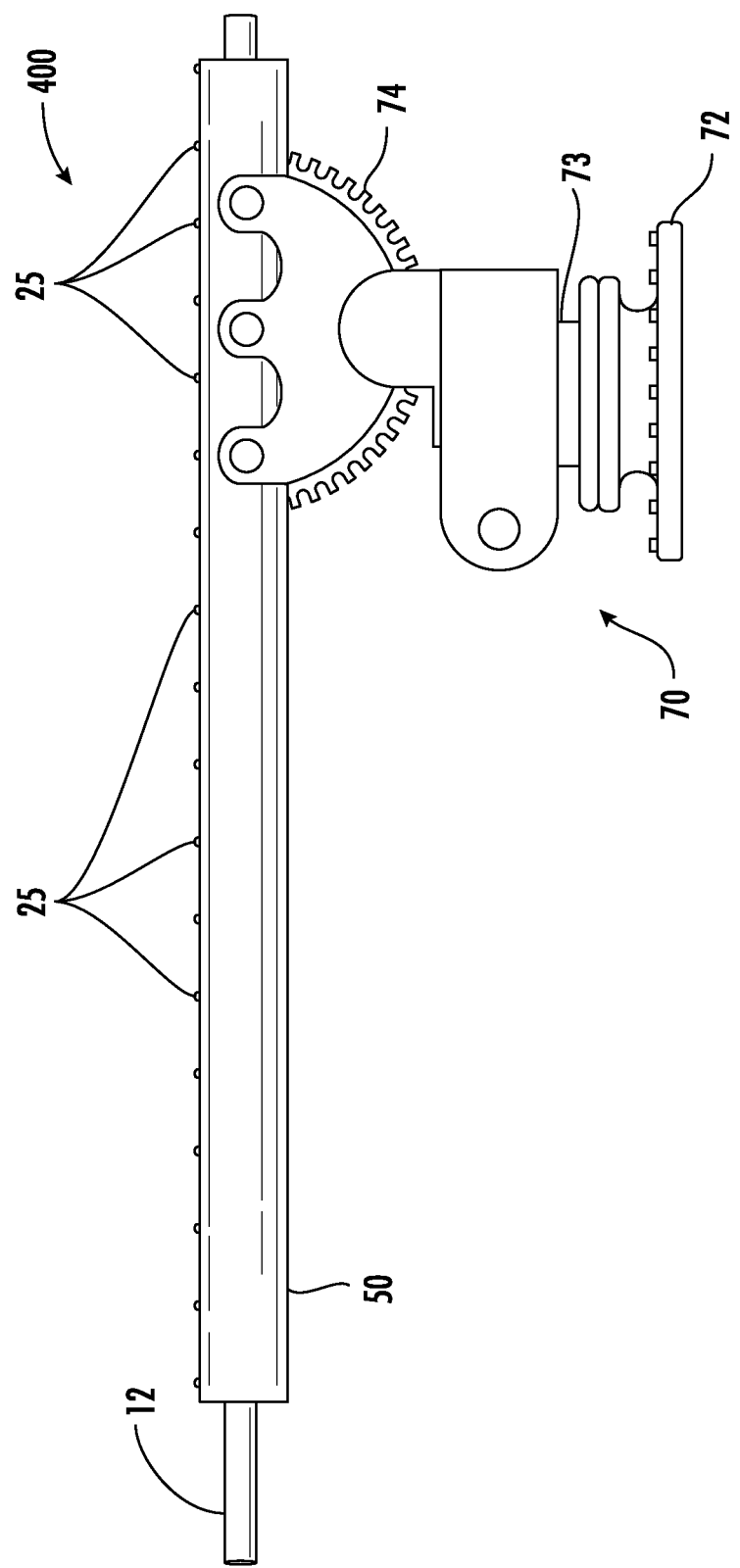
FIG. 14 illustrates an accelerator system according to various embodiments described herein.

FIG. 14 illustrates another embodiment of a multistage accelerator system 400 including twelve stages mounted to a similar targeting mount 70 as described with respect to FIG. 13. Accelerator system 400 may include similar features to that described herein with respect to the embodiments above. In one example, accelerator system 400 includes electrical assemblies including an electromagnetic coil comprising a conductor having a ribbon like profile. The coil conductor has a width of about 12 inches and a length of about 252 inches. The electrical contacts comprise rhodium and are positioned about 180 degrees in opposition along the interior surface of the barrel. The electrical contacts have rounded contours corresponding to the adjacent interior surface of the barrel 10. The barrel 10 is composed of a non-metallic, non-conductive material selected from a ceramic, a carbon fiber, or a carbon fiber ceramic composite. The accelerator system 400 electrically couples with twelve high-density capacitor bank modules providing a full megawatt of energy per cubic centimeter. Each capacitor bank module provides 50 mega joules of energy and is wired in parallel for a total power pulse of 600 mega joules with full capacity energy pulse firing in one microsecond. As the projectile enters each stage, it crosses electrical contact pairs in the center of each spirally wound electromagnetic coil, closing the circuit and causing the electromagnet to concentrate itself into the projectile, injecting 600 mega joules into the projectile each time the projectile crosses the electrical contact pair of a stage. The twelve capacitor banks provide a total of 7.2 gigajoules of energy per round of firing through all twelve stages. The accelerator system 400 may fire 30 rounds or more per minute sustained, without overheating.

The accelerator systems disclosed herein embodies substantial improvements over current electromagnetic accelerator technologies. For example, the accelerator systems may be configured for highly efficient transfer of force into projectiles. For example, as introduced above, when triggered, current propagating through each spirally wound coil turn has an electromagnetic induction created in it by the previous coil turn, thereby multiplying the electromagnetic force the electromagnetic coil creates. The point charge may then be aligned to the center of the electromagnetic coil, which, by design, may be aligned along the longitudinal center of the barrel. The point charge imparted on the projectile may also be centered, thereby aligning point charges of the electromagnet coil and the projectile. The accelerator systems may also be configured to accelerate a wide variety of projectiles, such as objects, particles, subatomic particles, gasses, and electromagnetic fields. Accelerator systems disclosed herein may also be configured to provide much higher current to the projectile than current electromagnetic accelerators as each stage is only energized for a brief period of time when projectile passes through one small point inside the barrel. The higher current results in more energy transfer. For example, accelerator systems disclosed herein may be configured such that the available current that may be provided to the projectile is limited only by the dielectric breakdown voltage of air (30,000 volts per centimeter) in the gap between positive and negative contact points. In the case of a six inch barrel diameter, for example, this equates to 457,320 volts.

Certain current electromagnetic accelerations, such as railguns and coil guns, are required to use pulsed power supplies that have historically limited their widely perceived potential. For example, when not timed properly, pulses may either weld projectiles to rails or minimize force transferred to a projectile. However, according to various embodiments described herein, disclosed accelerator systems may be configured to avoid the use of pulsed power supplies. For example, each electromagnetic acceleration stage is designed to fire for only a brief moment and may do so utilizing the full power discharge capability of the power supply capacitors to which it is coupled. Contact with electrical contacts also happens only extremely briefly, thereby minimizing resistive heating. Guide surfaces may also be constructed from low friction coefficient materials to avoid generation of excess frictional heat. The use of dissimilar electrical contacts and projectile materials wherein the electrical contacts are only energized for a brief instant may also be implemented to completely avoid issues present with other electromagnetic accelerators such as welding between the projectile and the accelerator.

Embodiments of the accelerator systems disclosed herein may also be used in a manner that effectively eliminates wasteful discharging of electromagnetic force into non-active space. For example, by utilizing electromagnetic compounding coils, which may be configured with respect to accelerator systems disclosed herein, to only act on the projectile, and not free space, the maximum amount of force may be delivered into the projectile rather than being wasted or discarded into the surrounding environment. Additionally, as noted above, accelerator systems disclosed herein may utilize the projectile as a trigger for electromagnet discharge thereby avoiding timing and sequencing limitations of electromagnetic acceleration such as coil guns.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth in this specification. Such embodiments may be obtained, for example, by combining, modifying, or reorganizing any of the disclosed steps, components, elements, features, aspects, characteristics, limitations, and the like, of the various non-limiting and non-exhaustive embodiments described in this specification. For example, in some embodiments, electromagnetic coils may be reverse wound or polarity may be reversed. Various embodiments including multiple stages may include electromagnetic coils having a same or different number of windings and/or conductor dimensions. Embodiments including multiple stages may include all, none, or groups of consistently or inconsistently spaced electrical assemblies. Electrical contacts may be of any suitable size, and electrical contacts of an electrical contact pair need not be of the same size. The amount of power supplied to electrical assemblies may also be the same or vary between electrical assemblies of a multistage system. In some embodiments, the relative position of electrical contacts of a contact pair may vary. For example, in some embodiments, first and second electrical contacts of a first electrical contact pair may be positioned at greater than or less than 180 degrees in opposition, longitudinally offset from each other, and/or longitudinally offset from the core of an electromagnetic coil. In some multistage embodiments, positions of first and second electrical contacts of electrical assemblies may be the same or differ between the member electrical assemblies. For example, the relative position of first and second electrical contacts of a second electrical contact pair may be the same or different from that of a first electrical contact pair. Thus, relative positions of electrical contacts within electrical contact pairs and/or among electrical contact pairs may be different. In some embodiments, the system may include one or more environmental modification devices configured to modify the environment with the bore of the barrel, such as between electrical contacts. For example, one or more pumps may be fluidically couple to the bore of the barrel to modify air pressure within the bore. In one instance, a vacuum may be applied within the bore of the barrel. The some embodiments, temperature modification devices may be used to modify temperature within the bore, e.g., between electrical contacts.

The grammatical articles "one", "a", "an", and "the", as used in this specification, are intended to include "at least one" or "one or more", unless otherwise indicated. Thus, the articles are used in this specification to refer to one or more than one (i.e., "at least one") of the grammatical objects of the article. By way of example, "a component" means one or more components, and thus, possibly, more than one component is contemplated and may be employed or used in an application of the described embodiments. Further, the use of a singular noun includes the plural, and the use of a plural noun includes the singular, unless the context of the usage requires otherwise. Additionally, the grammatical conjunctions "and" and "or" are used herein according to accepted usage. For example, "x and y" refers to "x" and "y". On the other hand, "x or y" generally refers to "x", "y", or both "x" and "y", and may be considered to be generally synonymous with "and/or," whereas "either x or y" refers to exclusivity.

The present disclosure may be embodied in other forms without departing from the spirit or essential attributes thereof and, accordingly, reference should be had to the following claims rather than the foregoing specification as indicating the scope of the invention. Further, the illustrations of arrangements described herein are intended to provide a general understanding of the various embodiments, and they are not intended to serve as a complete description. Many other arrangements will be apparent to those of skill in the art upon reviewing the above description. Other arrangements may be utilized and derived therefrom, such that logical substitutions and changes may be made without departing from the scope of this disclosure.

What is claimed is:

1. An electromagnetic accelerator system, the system comprising
   a spiral wound electromagnetic coil defining a core, the electromagnetic coil configured to electrically couple to a first pole of a power source;
   an acceleration path extending through the core; a first electrical contact positioned along the acceleration path and electrically coupled to the electromagnetic coil; and
   a second electrical contact positioned along the acceleration path and configured to electrically couple to a second pole of the power source, wherein the second electrical contact is spaced apart from the first electrical contact to provide an open circuit configured to be switched by a projectile to be accelerated when positioned therebetween to close the circuit and cause the power source to discharge through the electromagnetic coil and projectile to accelerate the projectile by Lorentz Force,
   wherein the electromagnetic coil comprises an outer winding configured to electrically couple the electromagnetic coil to the first pole of the power source and an inner winding that electrically couples the electromagnetic coil to the first electrical contact.

2. The system of claim 1, wherein at least one of the first electrical contact or the second electrical contact is positioned within the core.

3. The system of claim 2, wherein the first and second electrical contacts are positioned within the core.

4. The system of claim 1, wherein the first and second electrical contacts are positioned about 180 degrees in opposition.

5. The system of claim 4, wherein the first and second electrical contacts are positioned with the core.

6. The system of claim 1, wherein the projectile is an object, particle, gas, or electromagnetic field.

7. The system of claim 1, wherein the first pole is a negative pole of the power source and the second pole is a positive pole of the power source.

8. The system of claim 1, wherein the first pole is a negative pole of the power source.

9. The system of claim 1, further comprising a barrel extending through the core and having an inner surface defining a bore, wherein the acceleration path extends through the bore.

10. A method of accelerating a projectile, the method comprising:
    causing a projectile to position between first and second electrical contacts along an acceleration path that extends through a core of a spiral wound electromagnetic coil, wherein the first electrical contact is electrically coupled to the first contact and a first pole of a power source and the second electrical contact is electrically coupled to a second pole of the power source, wherein, when positioned between the two electrical contacts, the projectile acts as a switch to cause the power source to discharge through the electromagnetic coil to the first electrical contact and from the first electrical contact through the projectile to the second electrical contact, accelerating the projectile by Lorentz Force, and wherein the electromagnetic coil comprises an outer winding that electrically couples the electromagnetic coil to the first pole of the power source and an inner winding that electrically couples the electromagnetic coil to the first electrical contact.

11. The method of claim 10, wherein the first and second electrical contacts are positioned within the core.

12. The method of claim 10, wherein the first and second electrical contacts are positioned about 180 degrees in opposition.

13. The method of claim 10, wherein the projectile is an object, particle, gas, or electromagnetic field.

14. The method of claim 10, wherein the first pole is a negative pole of the power source and the second pole is a positive pole of the power source.

15. The method of claim 10, wherein the first pole is a negative pole of the power source.

16. An electromagnetic accelerator system, the system comprising:
- an open electrical circuit comprising a power source, a spiral wound electromagnetic coil, a first electrical contact, and a second electrical contact; and
- an acceleration path extending through a core of the electromagnetic core,
- wherein the first and second electrical contacts are spaced apart along the acceleration path and are electrically coupleable to close the open electrical circuit by a projectile to be accelerated that moves along the acceleration path between the first and second electrical contacts thereby acting as a switch to close the electrical circuit, and
- wherein the electromagnetic coil comprises an outer winding configured to electrically couple the electromagnetic coil to the first pole of the power source and an inner winding that electrically couples the electromagnetic coil to the first electrical contact.

* * * * *